US008717616B2

(12) United States Patent
Okada

(10) Patent No.: US 8,717,616 B2
(45) Date of Patent: May 6, 2014

(54) OPERATION SETTING DEVICE AND IMAGE FORMING APPARATUS PROVIDED WITH THE SAME

(75) Inventor: Mikiya Okada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 536 days.

(21) Appl. No.: 13/046,835

(22) Filed: Mar. 14, 2011

(65) Prior Publication Data

US 2011/0235130 A1    Sep. 29, 2011

(30) Foreign Application Priority Data

Mar. 24, 2010  (JP) ................................. 2010-067307

(51) Int. Cl.
*G06K 15/00*    (2006.01)

(52) U.S. Cl.
USPC .......... 358/1.18; 358/1.15; 358/1.9; 715/817; 715/788; 700/232; 700/302; 345/173; 345/156; 348/333.12

(58) Field of Classification Search
None
See application file for complete search history.

(56) References Cited

U.S. PATENT DOCUMENTS

| 5,402,152 | A  | * | 3/1995  | Needham ........................ 345/179 |
| 5,731,801 | A  | * | 3/1998  | Fukuzaki ........................ 715/842 |
| 6,538,636 | B1 | * | 3/2003  | Harrison ......................... 345/156 |
| 6,618,061 | B2 | * | 9/2003  | Yamamoto ...................... 715/817 |
| 8,161,418 | B2 | * | 4/2012  | Sodhi et al. .................... 715/867 |
| 8,363,147 | B2 | * | 1/2013  | Kaneda et al. ............ 348/333.12 |
| 2003/0218785 | A1 | * | 11/2003 | Sato ................................ 358/501 |
| 2005/0219220 | A1 | * | 10/2005 | Kishi et al. ..................... 345/169 |
| 2007/0209019 | A1 | * | 9/2007  | Kaval et al. ..................... 715/788 |
| 2009/0177619 | A1 | * | 7/2009  | Naito et al. ......................... 707/1 |
| 2009/0244003 | A1 | * | 10/2009 | Bonnat .......................... 345/157 |
| 2009/0265653 | A1 | * | 10/2009 | Sodhi et al. .................... 715/772 |
| 2010/0146461 | A1 | * | 6/2010  | Ryu et al. ....................... 715/863 |
| 2010/0169797 | A1 | * | 7/2010  | Lynk et al. ..................... 715/757 |
| 2010/0283889 | A1 | * | 11/2010 | Johnson ......................... 348/370 |
| 2011/0145749 | A1 | * | 6/2011  | Sailor et al. .................... 715/772 |
| 2011/0153115 | A1 | * | 6/2011  | Inderrieden et al. .......... 700/302 |
| 2011/0221685 | A1 | * | 9/2011  | Lee et al. ....................... 345/173 |
| 2012/0101690 | A1 | * | 4/2012  | Srinivasan et al. .............. 701/45 |
| 2012/0330461 | A1 | * | 12/2012 | Doom ............................ 700/232 |

FOREIGN PATENT DOCUMENTS

| JP | 2001-215943 |   | 8/2001 |
| JP | 2002-55752  |   | 2/2002 |
| JP | 2003-131528 |   | 5/2003 |
| JP | 2004-252715 | A | 9/2004 |
| JP | 2006-85370  | A | 3/2006 |
| JP | 2007323417  | A | * 12/2007 |
| JP | 2009-48096  | A | 3/2009 |

* cited by examiner

*Primary Examiner* — King Poon
*Assistant Examiner* — Ted Barnes
(74) *Attorney, Agent, or Firm* — Birch, Stewart, Kolasch & Birch, LLP

(57) ABSTRACT

An operation unit is provided with a touch panel display which includes a touch panel, a display panel, and a control portion which causes the display panel to display an operation screen so as to allow the touch panel to provide an operation instruction. The control portion is provided with an area display control portion which displays a function setting area and a task trigger area at positions opposing each other by taking a preview area as a reference on the operation screen, and a display position switching control portion which switches a positional relation in which the function setting area 2000 and the task trigger area 5000 are displayed.

14 Claims, 17 Drawing Sheets

OPERATION SETTING DEVICE AND IMAGE FORMING APPARATUS PROVIDED WITH THE SAME

This Nonprovisional application claims priority under 35 U.S.C. §119(a) on Patent Application No. 2010-67307 filed in Japan on 24 Mar. 2010, the entire contents of which are hereby incorporated by reference.

BACKGROUND OF THE INVENTION

1. Field of the Invention

The present invention relates to an operation setting device which is used for an electrophotographic image forming apparatus such as a copier, a printer, a facsimile or the like and an image forming apparatus provided with the same, and particularly, relates to an operation setting device capable of displaying an operation screen in a processing mode and an image forming apparatus provided with the same.

2. Description of the Prior Art

Conventionally, an image forming apparatus is known, which has a liquid crystal operation panel using a touch panel as an operation portion and which is operated by touching operation keys on an operation display screen displayed on the operation panel by a user with a finger.

As a conventional technique, one which horizontally flips display portions displaying an operation content or the like and display positions of operation keys which are displayed on a display panel equipped with a tablet corresponding to a dominant hand of a user (see Patent Literature 1).

Patent Literature 1: Japanese Patent Application Laid-open No. 2003-131528

According to the above-described conventional technique, however, the display positions are switched by a behavior of a user in operation, and a user should thus perform an operation to have a dominant hand of the user recognized when performing an operation. Furthermore, there is a possibility that the dominant hand is falsely recognized based on a behavior which is not intended by the user at the time so that an unintended screen is displayed.

Moreover, there is a possibility that when using a conventional device in combination in which the display position is not switchable, confusion occurs for some users due to an extensive change associated with a change of the display position of the display portion which occupies a large area of the operation display screen.

SUMMARY OF THE INVENTION

The present invention has been devised in view of the conventional problems as described above, and an object of the present invention is to provide an operation setting device which does not require an operation to have a dominant hand of a user recognized, is capable of preventing from becoming screen display that is not intended by a user, and with which an operation on an operation display screen is able to be performed easily corresponding to a dominant hand or the like of a user, and an image forming apparatus provided with the same.

A first aspect of the present invention is characterized in that an operation setting device (such as an operation panel or an operation unit) includes a touch operation recognition portion (such as a touch panel) which recognizes a touch operation in operating a screen, a display portion (such as a display panel) which displays an operation screen in a processing mode, and a control portion which causes the display portion to display the operation screen so as to allow the touch operation recognition portion to provide an operation instruction, in which the operation screen in the processing mode includes at least a preview area, a function setting area, and a processing start instruction area, and the control portion includes, on the operation screen, an area display function which displays the function setting area and the processing start instruction area at positions opposing each other by taking the preview area as a reference, and a display position switching function which switches a positional relation in which the function setting area and the processing start instruction area are displayed.

That is, the first aspect of the present invention is characterized in that, in the operation setting device, with a central focus on the preview area, the function setting area and the processing start instruction area are arranged horizontally to be displayed or arranged vertically to be displayed.

Note that, the touch operation includes an operation of touching of an operation key or the like on the operation screen by a finger of a user.

Further, the preview area is an area which displays in advance a document image to be printed and an image after print. Moreover, the function setting area is an area in which a mode to be displayed or the like is set. Additionally, the processing start instruction area is an area in which an instruction of starting/stopping of a processing operation is provided.

Further, a second aspect of the present invention is that an operation key is displayed in the processing start instruction area and the operation key includes a start key which provides an instruction of starting of a processing operation and a stop key which provides an instruction of stopping of the processing operation.

Further, a third aspect of the present invention is that a display position switching control portion which sets a position in which the function setting area and the processing start instruction area are displayed on the operation screen based on user information on a user who performs an operation is provided.

Further, a fourth aspect of the present invention is that provided are a user information management portion which manages user information on a user who performs an operation, a user discrimination portion which performs authentication of a user based on authentication information, and a display position switching control portion which sets positions in which the function setting area and the processing start instruction area are displayed on the operation screen based on the user information of a user who is authenticated by the user discrimination portion.

Further, in a fifth aspect of the present invention, it is preferred that dominant hand information which specifies whether a dominant hand of a user is a right hand or a left hand is included as the user information.

Further, in a sixth aspect of the present invention, it is preferred that height information which specifies a height (stature) of a user is included.

Further, in a seventh aspect of the present invention, it is preferred that specific setting information which specifies a setting of screen display desired by a user is included.

Further, in an eighth aspect of the present invention, it is preferred that the display position switching control portion includes, a function to display the processing start instruction area on a dominant-hand side of the user by taking the preview area as a reference, based on the dominant hand information.

Further, in a ninth aspect of the present invention, it is preferred that the display position switching control portion includes a function to display the processing start instruction area on an upper side by taking the preview area as a reference when the user is taller than a predetermined height, and to display the processing start instruction area on a lower side by taking the preview area as a reference when the user is shorter than the predetermined height, based on the height information.

Further, in a tenth aspect of the present invention, it is preferred that the display position switching control portion includes a function to display the processing start instruction area corresponding to a specific setting by taking the preview area as a reference based on the specific setting information.

Further, an eleventh aspect of the present invention is characterized in that an image forming apparatus provided with an operation setting device includes the operation setting device of any of the first aspect to the tenth aspect as the operation setting device.

According to the first aspect of the present invention, with a central focus on the preview area, the function setting area and the processing start instruction area are able to be arranged horizontally to be displayed, or arranged vertically to be displayed. That is, display of the operation screen is able to be switched with a central focus on the preview area, so that a smooth operation/instruction is able to be performed, corresponding to a dominant hand, a height, etc., of a user, in a state where a status of a function setting in a center area on the display screen is confirmed, while a desired output form is secured. Therefore, in displaying the operation screen, there is no need of an operation to have the dominant hand of the user recognized, and screen display that is not intended by the user is able to be prevented, so that the operation on the operation screen corresponding to the dominant hand, etc., of the user is able to be performed easily.

Further, according to the second aspect of the present invention, when a flaw or a deficiency is found in process setting and the like, started processing is able to be interrupted immediately, which makes it possible to suppress the wasteful processing (such as copying or transmission) to the minimum.

Further, according to the third aspect of the present invention, an optimum screen display is able to be performed corresponding to a user, and an operation on the operation screen is thus able to be performed easily corresponding to a dominant hand or the like of a user.

Note that, the display position switching control portion may include an operation key (display screen switching switch) on the operation screen, for example, so as to be selectively operated by a user.

Further, according to the fourth aspect of the present invention, an optimum screen display is able to be performed corresponding to a user, and an operation on the operation screen is thus able to be performed easily.

Further, according to the fifth aspect of the present invention, the function setting area and the processing start instruction area are able to be displayed at optimum positions in the horizontal direction corresponding to a dominant hand of a user, and an operation on the operation screen is thus able to be performed more easily.

Further, according to the sixth aspect of the present invention, the function setting area and the processing start instruction area are able to be displayed at optimum positions in the vertical direction corresponding to a height of a user, and an operation on the operation screen is thus able to be performed more easily.

Further, according to the seventh aspect of the present invention, the function setting area and the processing start instruction area are able to be displayed at original and optimum positions corresponding to a user, and an operation on the operation screen is thus able to be performed more easily.

Further, according to the eighth aspect of the present invention, the processing start instruction area is able to be displayed automatically and accurately at a position corresponding to a dominant hand of a user.

Further, according to the ninth aspect of the present invention, the processing start instruction area is able to be displayed automatically and accurately at a position corresponding to a height of a user.

Further, according to the tenth aspect of the present invention, the processing start instruction area is able to be displayed automatically and accurately at a position that is desired and easily operated by a user.

Further, according to the eleventh aspect of the present invention, in displaying the operation screen, for the display positions of the preview area, the function setting area and the processing start instruction area displayed on the operation screen, with a central focus on the preview area, it is possible to horizontally arrange and display, or vertically arrange and display the function setting area and the processing start instruction area. That is, display of the operation screen is able to be switched with a central focus on the preview area, so that smooth operation/instruction is able to be performed, corresponding to a dominant hand, a height, etc., of a user, in a state where a status of a function setting in a center area on the display screen is confirmed, while a desired output form is secured. Therefore, in displaying the operation screen, there is no need to have a dominant hand of a user recognized, and screen display that is not intended by a user is able to be prevented, and an operation on the operation screen is able to be performed easily corresponding to a dominant hand or the like of a user.

DESCRIPTION OF THE PREFERRED EMBODIMENTS

Description will be hereinafter given for an embodiment of the present invention with reference to accompanying drawings.

Figure 1:
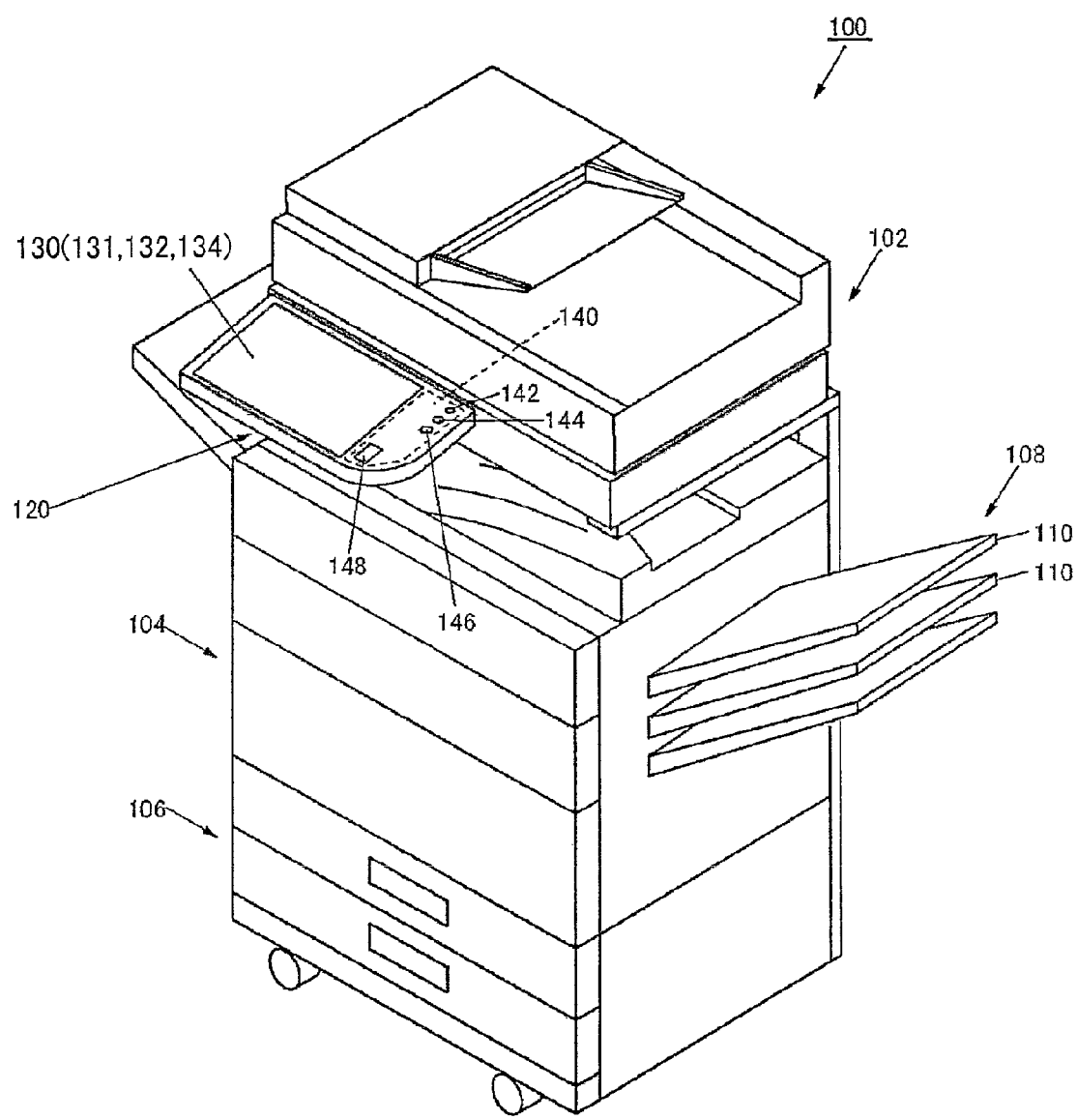
FIG. 1 is an explanatory view showing an entire configuration of an image forming apparatus using an operation setting device according to an embodiment of the present invention.
Figure 2:
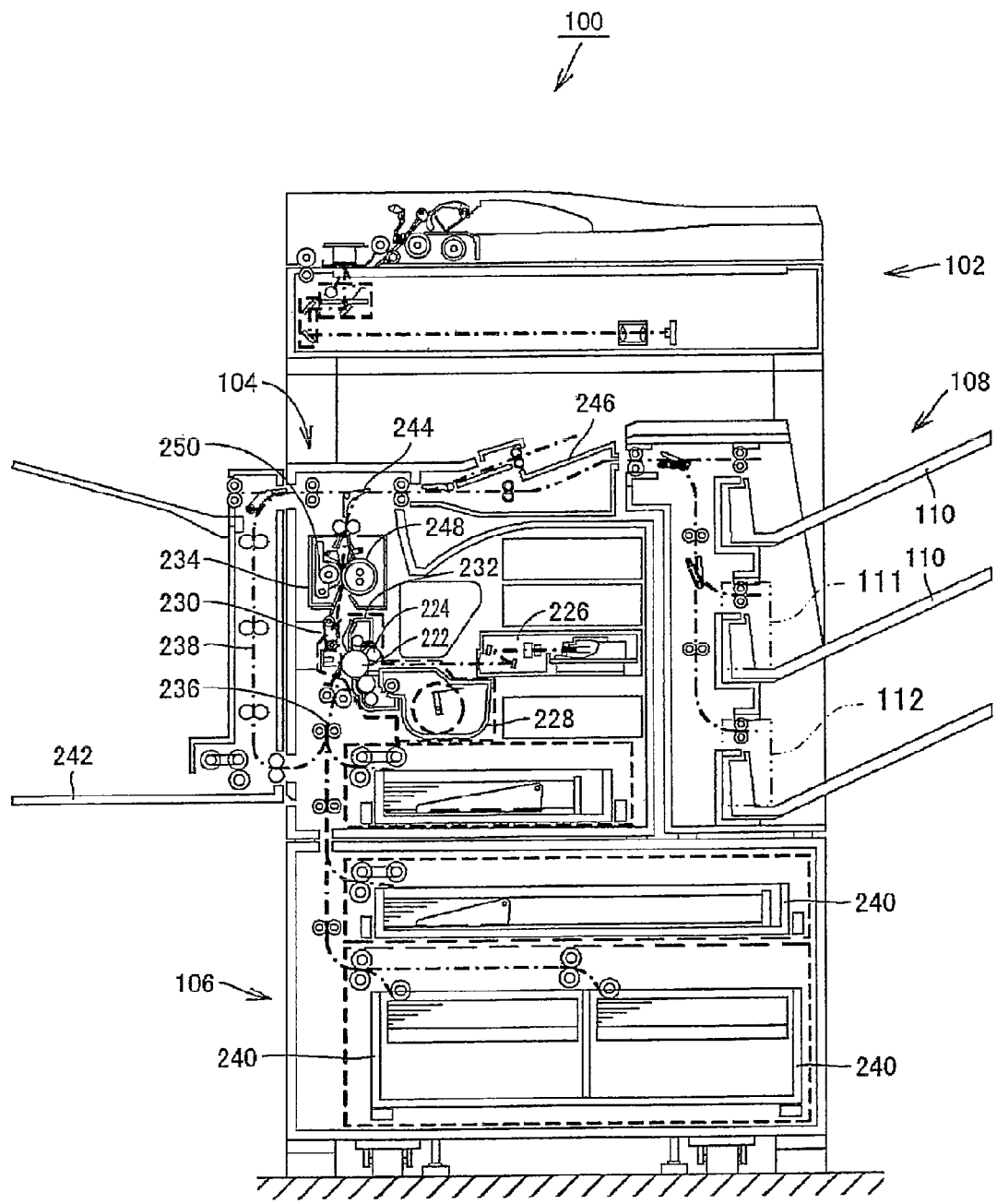
FIG. 2 is an explanatory view showing a simplified inside configuration of the image forming apparatus.
Figure 3:
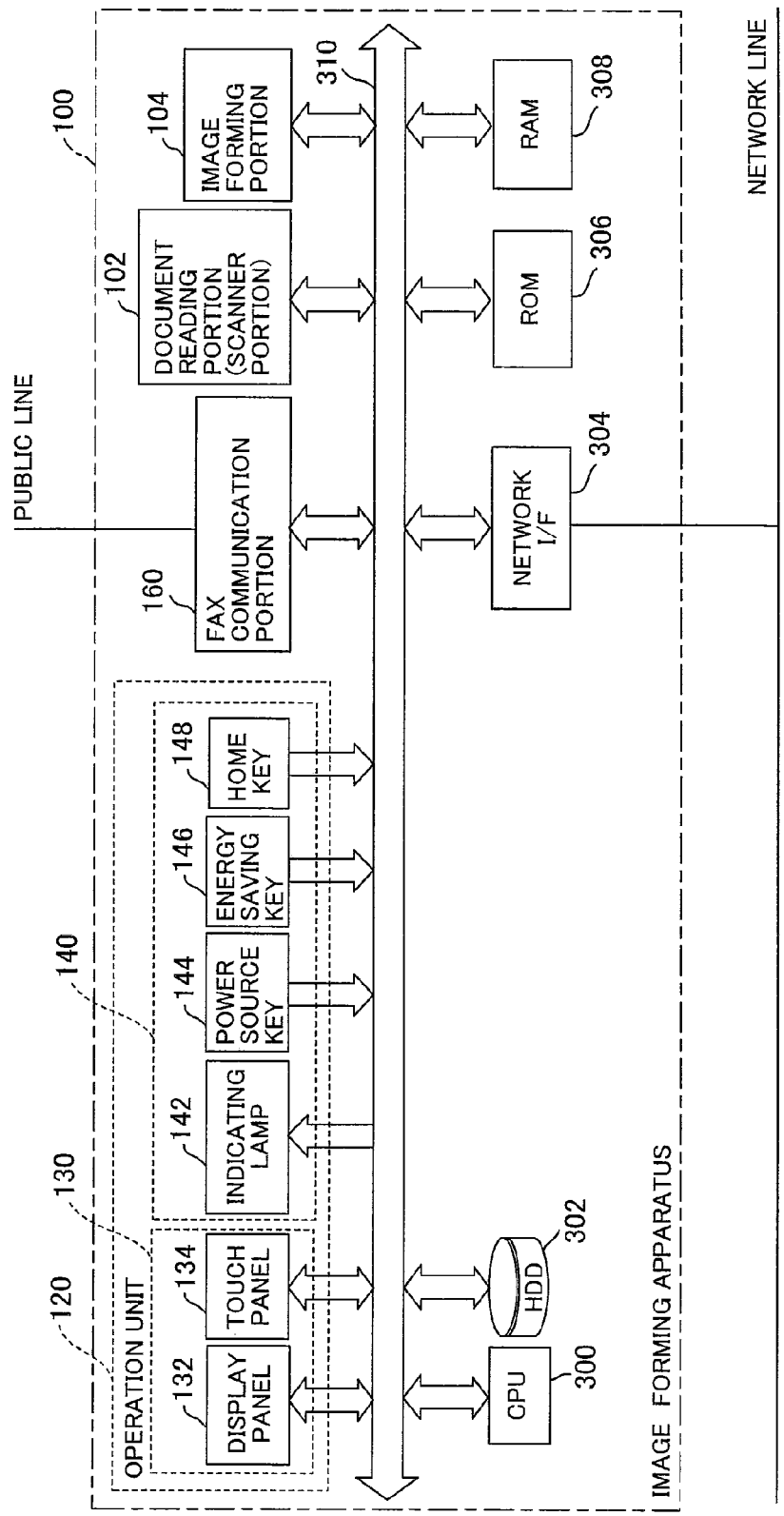
FIG. 3 is a functional block diagram showing a hardware configuration of the image forming apparatus.
Figure 4:
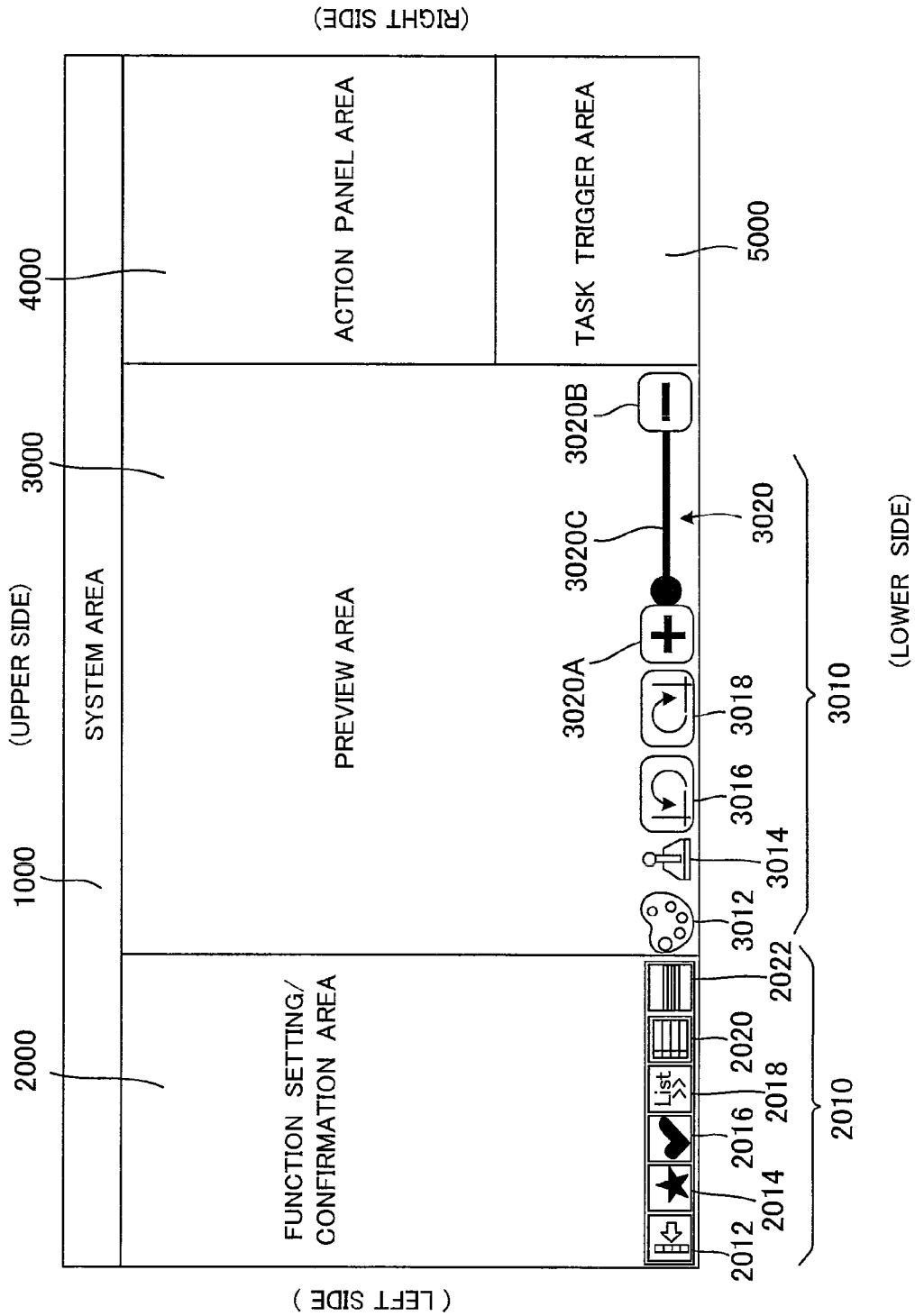
FIG. 4 is an explanatory view showing a display area of a touch panel display of the image forming apparatus.
Figure 5:
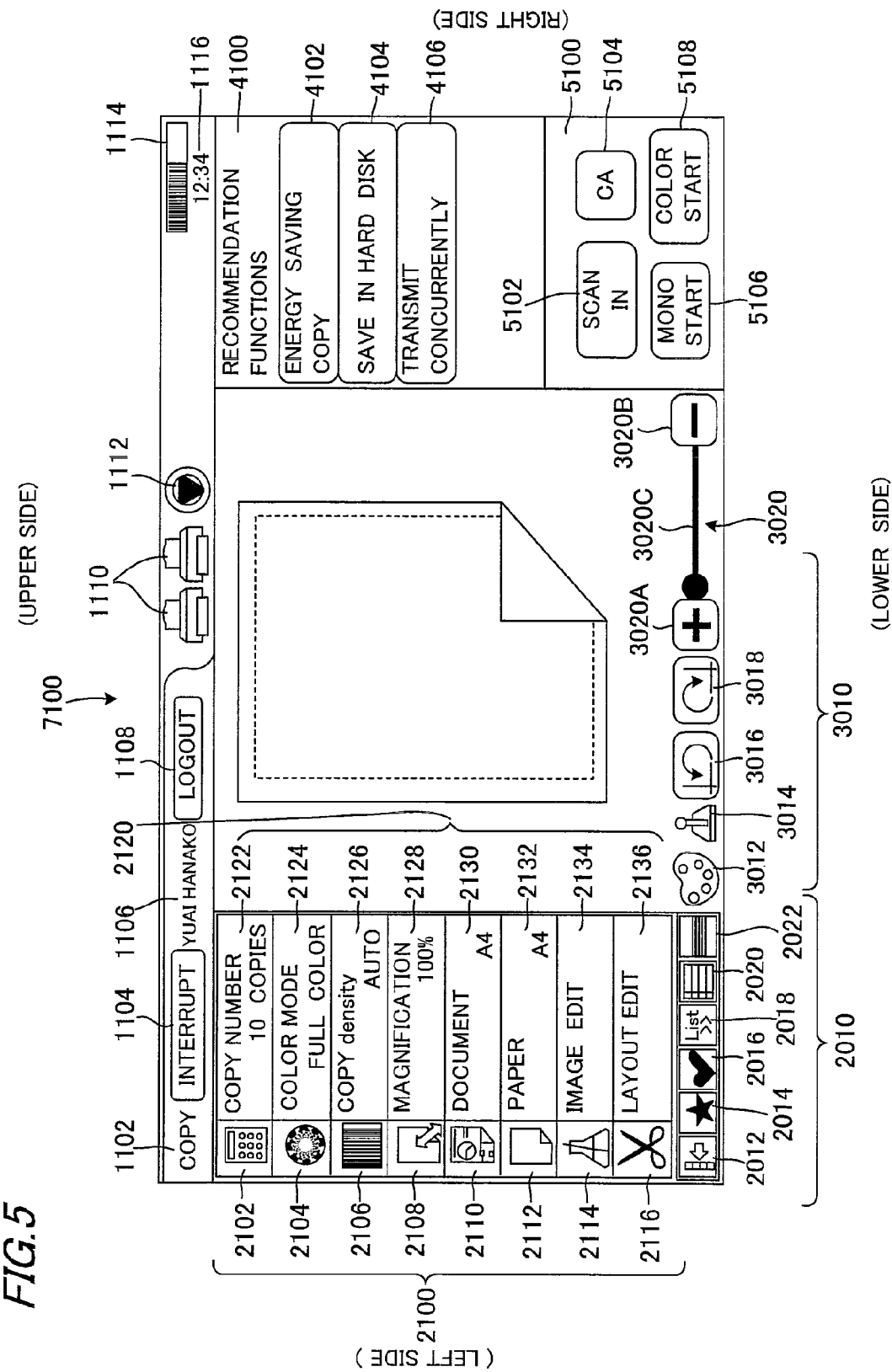
FIG. 5 is an explanatory view showing a screen example displayed on the touch panel display.
Figure 6:
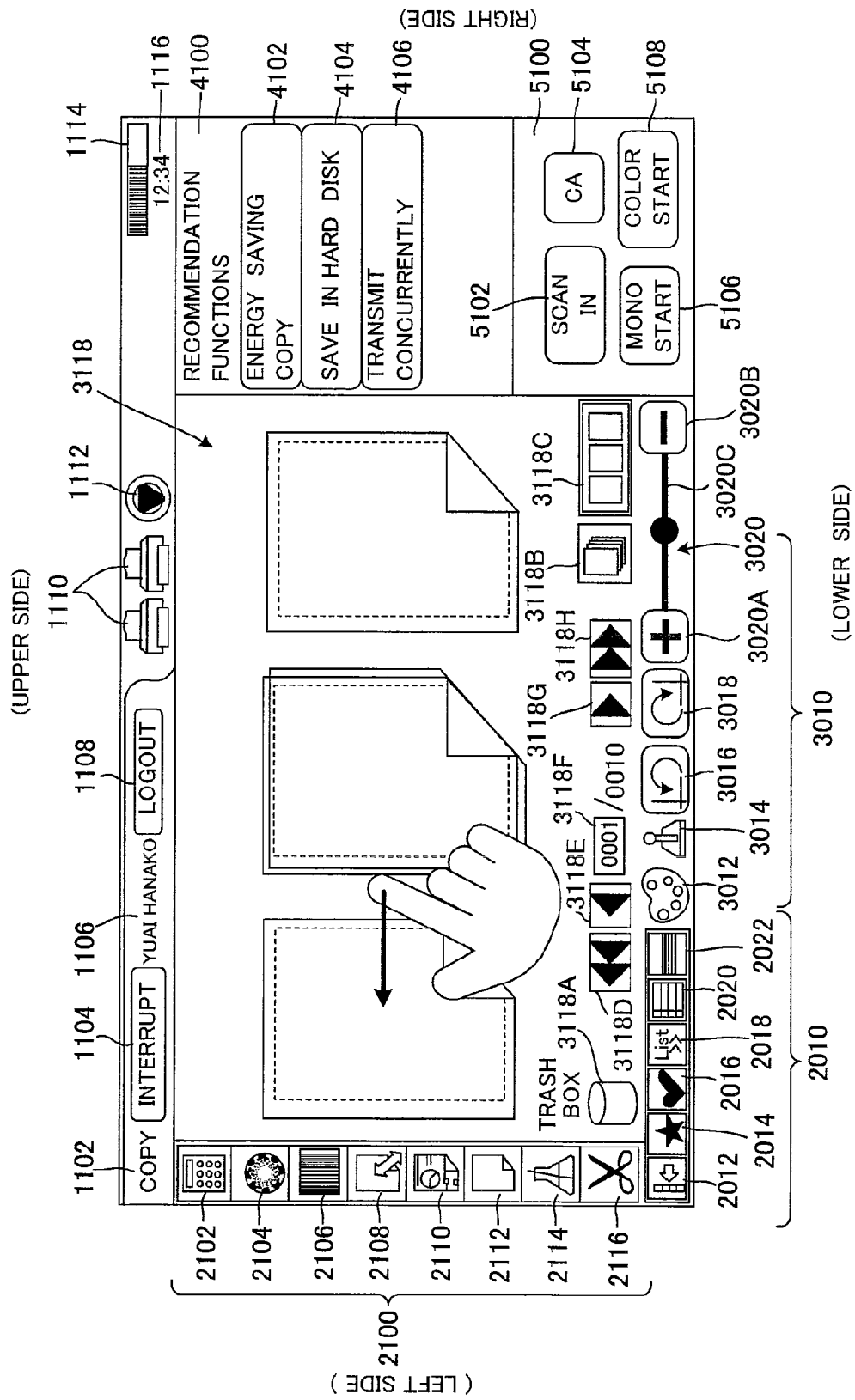
FIG. 6 is an explanatory view showing a state where a preview area displayed on the touch panel display is changed.

FIG. 1 is an example of an embodiment for carrying out the invention, and is an explanatory view showing an entire configuration of an image forming apparatus using an operation setting device according to an embodiment of the present invention, FIG. 2 is an explanatory view showing a simplified inside configuration of the image forming apparatus, FIG. 3 is a functional block diagram showing a hardware configuration of the image forming apparatus, FIG. 4 is an explanatory view showing a display area of a touch panel display of the image forming apparatus, FIG. 5 is an explanatory view showing a screen example displayed on the touch panel display, and FIG. 6 is an explanatory view showing a state where a preview area displayed on the touch panel display is changed.

An operation unit (operation setting device) 120 according to the present embodiment is provided with, as shown in FIG. 1, a touch panel display 130 including a touch panel (touch operation recognition portion) 134 which recognizes a touch operation in a screen operation by a finger of a user, as well as a display panel (display portion) 132 which displays an operation screen in a processing mode and a control portion 131 which causes the display panel 132 to display the operation screen so that an operation instruction is able to be given by a finger of a user with the touch panel 134.

The image forming apparatus 100 according to the present embodiment is one type of the image forming apparatus. The operation setting device according to the present invention is also applicable to an image processing apparatus other than such an image forming apparatus or to an electronic device.

Furthermore, the image forming apparatus 100 is provided with a processing mode and a display device for displaying information of the processing mode. It is preferable for the display device to display information so that a user is able to easily obtain information the user wants even though the user does not remember a configuration of a screen in a case where the screen is switched to the processing mode.

Note that, the image forming apparatus 100 is provided with a touch panel display (operation screen) which is able to be operated by a gesture operation method and a touch operation method without the gesture operation, however, may be provided with a touch panel display on which only the touch operation is able to be performed, and further may be provided with a display panel which is available only for display on which an operation is impossible and an operation button.

Note that, the gesture operation is an operation for which a meaning is created with respect to various motions of fingers in combination with a GUI (Graphical User Interface), such as creating a meaning for reactions corresponding to a moving amount or a speed of a finger, a double tap, and respective movement tracks.

The image forming apparatus 100 forms an image on a recording sheet with electrophotography.

Further, the image forming apparatus 100 is provided with, as an operation mode, a copy mode, a facsimile mode (FAX mode), a document filing mode (a mode for storing a scanned image in a storage device inside the image forming apparatus) and a mail mode (a mode for transmitting a scanned image in a form of attaching the image to an electronic mail). Note that the image forming apparatus 100 may further include a network printer mode.

Moreover, for a display screen of the image forming apparatus 100, a screen may be switched for each operation mode. Additionally, the printing method is not limited to the electrophotography.

First, description will be given for the image forming apparatus 100.

The image forming apparatus 100 includes a document reading portion 102, an image forming portion 104, a paper feed portion 106, a paper discharge processing device 108 and an operation unit 120.

The operation unit 120 is composed of a touch panel display 130 and a display operation portion 140.

The touch panel display 130 is composed of a display panel 132 composed of a liquid crystal panel and the like and a touch panel (touch operation recognition means) 134 that is arranged so as to overlap the display panel 132 and detects a position pressed by a finger of a user.

The display operation portion 140 is composed of an indicating lamp 142, a power source key 144, an energy conservation key (hereinafter referred to as "energy saving key") 146, and a home key 148 for returning a display screen of the touch panel display 130 to a home screen on which an operation mode is selected.

In this manner, the image forming apparatus 100 is provided with the touch panel display 130 as a main operation device, as well as includes the display operation portion 140 composed of a hardware key and the indicating lamp.

The keys of the display operation portion 140 (power source key 144, energy saving key 146, home key 148) are configured as hardware buttons in contrast to a software button composed of the touch panel display 130.

Note that, the image forming apparatus 100 is not limited to the one including the display operation portion 140 configured in this manner, and may be the one provided only with the touch panel display 130. It may be configured to be switched to an initial screen in a selected operation mode, when a user selects the operation mode on the home screen displayed on the touch panel display 130. Description will be given for such an operation mode of the image forming apparatus 100.

(Copy Mode)

Description will be hereinafter given for an operation in the copy mode in the image forming apparatus 100.

In the copy mode, a document reading portion (hereinafter, referred to as a "scanner portion") 102 and an image forming apparatus 104 mainly operate.

A document placed on a document platen is read by the document reading portion 102 as image data, and the read image data is input to a CPU 300 composed of a microcomputer or the like as shown in FIG. 3, then various image processing is applied to the image data here, and such image data is output to the image forming portion 104.

The image forming portion 104 is, as shown in FIG. 2, to print an image of a document indicated by image data to a recording medium (mostly, a recording sheet), and provided with a photoreceptor drum 222, a charging device 224, a laser scanning unit (hereinafter referred to as an "LSU") 226, a developing device 228, a transfer device 230, a cleaning device 232, a fixing device 234, a not-shown neutralization device and the like.

In the image forming portion 104, a main conveying path 236 and a reverse conveying path 238 are provided to convey a recording sheet fed from the paper feed portion 106 along the main conveying path 236. The paper feed portion 106 draws sheet by sheet the recording sheets contained in a paper cassette 240, or the recording sheets placed on a manual paper feed tray 242 to be sent out to the main conveying path 236 of the image forming device 104.

While the recording sheet is being conveyed along the main conveying path 236 of the image forming apparatus 104, the recording sheet passes through between the photoreceptor drum 222 and the transfer device 230 and further passes through the fixing device 234, then printing for the recording sheet is performed.

The photoreceptor drum 222 rotates in one direction and a surface thereof is cleaned by the cleaning device 232 and the neutralization device, and thereafter charged uniformly with the charging device 224.

The LSU 226 modulates laser light based on the image data to be printed, and with the laser light, the surface of the photoreceptor drum 222 is repeatedly scanned in a main scanning direction so that an electrostatic latent image is formed on the surface of the photoreceptor drum 222.

The developing device 228 supplies a toner on the surface of the photoreceptor drum 222 to develop the electrostatic latent image and a toner image is formed on the surface of the photoreceptor drum 222.

The transfer device 230 transfers the toner image on the surface of the photoreceptor drum 222 onto the recording sheet that passes through between the transfer device 230 and the photoreceptor drum 222.

The fixing device 234 includes a heating roller 248 for heating a recording sheet and a pressing roller 250 for pressing the recording sheet. The recording sheet is heated with the heating roller 248 as well as pressed with the pressing roller 250, whereby the toner image transferred onto the recording sheet is fixed on the recording sheet. A temperature of the heating roller 248 is controlled to be a temperature which is suitable for fixing by warming a heater with electricity supplied to the fixing device 234. Note that, when it is shifted to the energy saving mode, for example, the electricity supplied to the heater is stopped or reduced.

At a connecting position of the main conveying path 236 and the reverse conveying path 238, a branching claw 244 is arranged. When printing is performed only on one side of a recording sheet, the branching claw 244 is positioned, and the recording sheet from the fixing device 234 is guided toward a paper discharge tray 246 or a paper discharge processing device 108 by the branching claw 244.

When printing is performed on both sides of a recording sheet, the branching claw 244 is pivoted in a predetermined direction so that the recording sheet is guided toward the reverse conveying path 238. The recording sheet passes through the reverse conveying path 238, whose front and back sides are revered and conveyed again to the main conveying path 236, then, in the middle of a return conveyance on the main conveying path 236, printing on the back side is performed and guided toward the paper discharge tray 246 or the paper discharge processing device 108.

The recording sheet printed as described above is guided toward the paper discharge tray 246 or the paper discharge processing device 108 to be discharged to the paper discharge tray 246, or discharged to any of respective paper discharge trays 110 of the paper discharge processing device 108.

In the paper discharge processing device 108, processing to distribute a plurality of recording sheets to respective paper discharge trays 110 to be discharged, processing to punch each recording sheet, and processing to staple each recording sheet are applied. When a plurality of printed materials are prepared, respective recording sheets are distributed and discharged to respective paper discharge trays 110 so that each copy of the printed material is assigned to each of the paper discharge trays 110, and for each of the paper discharge trays 110, punching processing with a punching unit 111 or staple processing with a staple unit 112 is applied to each recording sheet on each of the paper discharge trays 110 so that the printed materials are prepared.

(Facsimile Mode)

Description will be given for an operation in a facsimile mode.

In the facsimile mode, as shown in FIG. 3, a transmission operation is performed mainly by an operation of the document reading portion (scanner portion) 102 and a FAX communication portion 160, and a reception operation is performed by an operation of the FAX communication portion 160 and the image forming portion 104.

(Transmission Operation)

As to the transmission operation, a facsimile mode is designated, a document placed on a document platen is read by the document reading portion 102 as image data and the read image data is input to a CPU 300 composed of a microcomputer and the like as shown in FIG. 3, and various image processing is applied to the image data here, and the applied image data is output to the FAX communication portion (FAX communication portion 160 in FIG. 3).

As shown in FIG. 3, the FAX communication portion 160 in the image forming apparatus 100 on a transmission side connects a designated line on the transmission side to a transmission destination, converts the image data to communication data which is corresponded with facsimile communication standards, and transmits the data to a facsimile device on a reception side (the image forming apparatus 100 provided with a facsimile function, for example).

(Communication Operation)

When the line is connected, the FAX communication portion 160 of the image forming apparatus 100 on the reception side detects a communication request signal from the FAX communication portion 160 of the image forming apparatus 100 on the transmission side, and transmits a response signal. Thereafter, for example, the FAX communication portions 160 on the transmission side and the reception side exchange capacity information implemented therewith each other and decide a communication speed and methods of image data coding/code correction with available maximum capacity to set a communication method of modems. With use of the communication method, data is transmitted from the FAX communication portion 160 of the image forming apparatus 100 on the transmission side to the FAX communication portion 160 of the image forming apparatus 100 on the reception side. When transmission is finished, the line is disconnected.

(Reception Operation)

The FAX communication portion 160 of the image forming apparatus 100 on the reception side converts the received data into image data to be sent to the image forming portion 104. Note that, the received data may be converted into the image data by the image forming portion 104. The image forming portion 104 prints on a recording sheet the image of the document indicated by the image data converted from the received data the same way as the operation in the above-described copy mode.

Next, description will be given for a control block configuration of the image forming apparatus 100 with reference to drawings.

As shown in FIG. 3, the image forming apparatus 100 further includes an operation unit 120 with which a user performs settings of a copy mode and a facsimile mode, a ROM 306 for storing a program and the like, a hard disk 302 which is a nonvolatile storage area in which a program, data and the like are able to be stored even when electric power supply is blocked, and a RAM (Random Access Memory) 308 for providing a storage area in executing a program.

The image forming apparatus 100 further includes a document reading portion 102, an image forming portion 104, a FAX communication portion 160, an operation unit 120, a ROM 306, a hard disk 302, a bus 310 connected to the RAM 308, and a CPU 300 connected to the bus 310 for realizing general functions as the image forming apparatus.

In the hard disk 302, a file of image data of a document scanned in the image forming apparatus 100 is stored. Further, in the hard disk 302, initial screen data of each operation mode is recorded (stored). (It is also possible to record the files and the data stored in the hard disk 302 in the ROM 306).

In the ROM 306, a program and data, etc., required to control the operation of the image forming apparatus 100 is stored. As the data to be stored in the ROM 306 with the program, the initial screen data of each operation mode may be stored. The CPU 300 controls the image forming apparatus 100 in accordance with the program and the data stored in the ROM 306 as well as executes control relating to each function of the image forming apparatus 100.

As shown in FIG. 3, a public line is connected to the FAX communication portion 160 of the image forming apparatus 100 for transmission and reception of the image data, and a network line is connected to a network interface 304. To the network line, a computer or the like which uses the image forming apparatus 100 as a printer compatible with the network is connected, or a computer or the like which is specified by a URL (Uniform Resource Locator) designated through the internet is connected. When a connection to the internet is made in this way, the image forming apparatus 100 is able to obtain necessary information through the internet.

The RAM 308 provides a function as a working memory to temporarily store results of calculation and processing performed by the CPU 300, and a function as a frame memory to record the image data.

Control for the document reading portion 102, the image forming portion 104, the touch panel display 130 and the display operation portion 140 constituting the operation unit 120, as well as the ROM 306, the hard disk 302 and the RAM 308 is performed by executing a predetermined program by the CPU 300. Note that, the operation unit 120 communicates with the CPU 300 through an input/output interface.

The operation unit 120 is composed of a plate-like panel which is arranged to be slanted so as to be visually observed by a user easily. On the surface of the operation unit 120, in an area on a left side thereof, a touch panel display 130 is provided, and in an area on a right side thereof, a display operation portion 140 (indicating lamp 142 as well as a power source key 144, an energy saving key 146 and a home key 148 as hardware buttons) is provided. The touch panel display 130 and the display operation portion 140 are integrally provided with the operation unit 120.

As described above, the touch panel display 130 is composed of the display panel 132 and the touch panel 134 arranged so as to overlap the display panel 132.

On the display panel 132, a home screen on which an operation mode of the image forming apparatus 100 is selected, a current state of the image forming apparatus 100, a destination designation status, a job processing status and the like are displayed. On the display area of the display panel 132, a selection button which is a software button is displayed, and when an area in which the selection button is displayed is pressed with a finger, the touch panel 134 detects the pressed position. On the program the display position of the selection button is matched with the position in which the touch panel 134 is pressed, whereby a selection of the operation mode, a function setting, an operation instruction and the like of the image forming apparatus 100 are performed. The image forming apparatus 100 is also adapted to the above described gesture operation (a command input operation based on an operation track by a user) in addition to such a touch operation (a command input operation based on a pressed position by a user).

Further, the indicating lamp 142 of the display operation portion 140 is, for example, composed of an LED (Light Emitting Diode) and whose turning-on/turning-out (/flickering) is controlled by the CPU 300. When the power source key 144 which is provided separately from the main power source switch is pressed by a user, the image forming apparatus 100 is shifted from a standby mode (where the main power source is in the state of turned on and only the FAX reception operation is possible, for example) to a normal mode, so that all the operation modes of the image forming apparatus 100 are able to be used. In conjunction with such a state, the indicating lamp 142 is turned on. Further, in a case where a non-operation time by a user elapses a predetermined time, or in a case where the energy saving key 146 is pressed by the user, the image forming apparatus 100 is shifted from the normal mode to the energy saving mode so that only a part of the operation modes of the image forming apparatus 100 is able to be used. In conjunction with such a state, the indicating lamp 142 flickers. Furthermore, when the user presses the energy saving key 146 in the energy saving mode, the image forming apparatus 100 shifts from the energy saving mode to the normal mode. A home key 148 is a hardware key for returning display of the touch panel display 130 to an initial state (home screen). Note that, processing at the time of pressing the power source key 144, the energy saving key 146, and the home key 148 are not limited thereto.

Note that, a key lamp whose turning-on/turning-out (/flickering) is controlled by the CPU 300 may be embedded in the hardware button (power source key 144, energy saving key 146 and home key 148) of the display operation portion 140. For example, the key lamp brightens a circumference of the circular key in a ring shape, or brightens a center portion of the key. At the time when the hardware button is permitted to be used as the operation device (at the time when the hardware button is used and the processing is executed), the key lamp is turned on.

The image forming apparatus 100 includes the above-described two operation modes (copy mode, FAX mode). On the touch panel display 130, a software button for a function setting in each operation mode, and as necessary, a button for a preview which is an image forming image or for setting a destination, and the like is displayed.

When the operation mode is different, the touch panel display 130 displays a different screen. Even in such a case, the touch panel display 130 is divided into a plurality of areas (and with the size of the area variable) so that the user is able to find required information easily, and information is displayed in each area.

In such an image forming apparatus 100, especially, when an operation mode is selected in the home screen of the touch panel display 130 provided as the main display operation device, an initial screen of each operation mode is displayed. In the initial screen, (1) a basic layout is arranged appropriately by divided into 5 areas ("system area", "function setting area", "preview area", "action panel area", "task trigger area"), and therefore a setting is possible to be performed easily with the operation of the user from the top left to the bottom right (in order to realize a movement line of a viewpoint of a user and a movement line of a finger tip which is similar to those in a conventional device without such a large-type touch panel display 130), and (2) even in the different operation mode, a concept displayed in each of the five areas is the same, and even through the operation mode is different, the user is able to perform an operation without getting confused. Description will be hereinafter given for the configuration of such a basic layout.

Description will be given for the basic layout in the touch panel display 130 with reference to drawings.

For the basic layout of the touch panel display 130, as shown in FIG. 4, the horizontally extended touch panel display 130 is composed of a system area 1000 arranged at an uppermost portion, a preview area 3000 arranged at a screen center portion, a function setting/confirmation area 2000 arranged on a left side of the preview area 3000, an action panel area 4000 arranged at an upper right portion of the preview area 3000, and a task trigger area (processing start instruction area) 5000 arranged at a lower right portion of the preview area 3000. Note that, the horizontally-extended touch panel display 130 may be, for example, composed with width: 1024 pixels×height: 600 pixels. Moreover, the function setting/confirmation area 2000 is hereinafter described as a function setting area 2000.

Note that, the number of the areas in the touch panel display 130 is not limited to 5, and it may be configured that the function setting area 2000, the preview area 3000 and the task trigger area 5000 are included, and the arrangement in the horizontal direction is not limited thereto, and for example, the arrangement of the areas in the left and right may be reversed corresponding to the dominant hand of the user. Moreover, the position of the system area 1000 may be at the lowermost portion. Further detailed description will be later given on this matter.

In the system area 1000, a state at the present moment of the image forming apparatus 100 is displayed and a title of the operation mode in operation, a condition/status of the image forming apparatus 100 are displayed. For example, in the system area 1000, an operation mode name, an interrupt key, a login user name, a job status in processing, a using state of an embedded memory, a time and the like are displayed.

In the function setting area 2000, a function selection menu (icon, button, etc.,) operated by a user for setting each function, switching display and confirming a setting, whose display embodiment is changed in an icon mode, a regular mode, and an express mode to be displayed.

In the icon mode, only an icon for a function setting is displayed in the function setting area 2000 so that the preview area 3000 is broaden at the maximum.

In the express mode, a screen on which functions are set at once is largely displayed in the function setting area 2000 even though the preview area 3000 is most narrowed.

In the regular mode, a size of the preview area 3000 is a size between those of the icon mode and the express mode, and a function name is displayed in text along with the icon of the function setting in the function setting area 2000.

Switching to the icon mode, the regular mode, and the express mode is based on the operation of the user. That is, the size of the preview area 3000 is changed and displayed corresponding to the operation of the user. In this manner, the icon is capable of communicating information to the user in a small area, and is thus preferable to be prepared for all the functions so that the preview area 3000 is able to be displayed largely.

In the function setting area 2000, at a lower portion thereof, a change button group 2010 for changing a display style of the function setting area 2000 is provided.

In the change button group 2010, an icon mode shift button 2012 for displaying the function setting area 2000 in the icon mode, a favorite button 2014 for displaying a function registered to "favorites", a check button 2016 for displaying a function whose setting is changed, a list button 2018 for displaying a list of all the functions which are able to be set in the selected operation mode, a regular mode shift button 2020 for displaying the function setting area 2000 in the regular mode, and an express mode shift button 2022 for displaying the function setting area 2000 in the express mode are arranged.

Note that, when there is a lot of information to be displayed in the function setting area 2000, such information is displayed in the function setting area 2000 so as to be able to scrolled in a vertical direction. In this case, the change button group 2010 is not scrolled and displayed at the lowermost portion of the function setting area 2000 at all times.

In the preview area 3000, an output (finished) image of a document is displayed. An image is displayed with use of dummy data or scan data, and the image displayed in the preview area 3000 is changed every time a user sets the finish. In the preview area 3000, two modes are included which are finish display with the dummy image in a virtual mode before scanning and finish display with an actual image in a scan-in mode after scanning, and further in the virtual mode, there are two kinds of the modes before setting a document and after setting a document.

In the preview area 3000, at a lower part thereof, a preview change button group 3010 for changing a display style of the preview area 3000 is provided.

In the preview change button group 3010, a left rotation button 3016 for rotating a preview to the left at a 90-degree angle, a right rotation button 3018 for rotating the preview to the right at a 90-degree angle, and a zoom bar 3020 are arranged. Other than these, for example, a color change button 3012 and a preview operation button 3014 are arranged.

Here, when one touch operation is performed for the left rotation button 3016, a preview is rotated to the left at a 90-degree angle, and when two touch operations are performed, the preview is rotated to the left at a 180-degree angle (flip vertical). Furthermore, even when a gesture operation is performed for the finished document image displayed in the preview area (even when the document image is rotated at a 180-degree angle in the direction of a counterclockwise rotation with a finger tip), the preview is rotated to the left at a 180-degree angle so as to be flipped vertically.

When one touch operation is performed for the right rotation button 3018, a preview is rotated to the right at a 90-degree angle, and when two touch operations are performed, the preview is rotated to the right at a 180-degrees angle (flip vertical). Furthermore, even when the gesture operation is performed for the finished document image displayed in the preview area (even when the document image is rotated at a 180-degree angle in the direction of a clockwise rotation with a finger tip), the preview is rotated to the right at a 180-degree angle so as to be flipped vertically.

When the touch operation is performed for a plus button 3020A of the zoom bar 3020, or when the gesture operation (sliding) is performed for the bar 3020C to a side of the plus button 3020A, a preview is enlarged to be displayed. Furthermore, even through the gesture operation is performed for the finished document image displayed in the preview area (even though pinch-out/pinch-open is performed for the document image with finger tips), the preview is enlarged to be displayed. Note that, the pinch-out/pinch-open is an operation of enlarging performed with widening a space between two fingers.

When a touch operation is performed for a minus button 3020B of the zoom bar 3020, or when the gesture operation (sliding) is performed for a bar 3020C to a side of the minus button 3020B, a preview is reduced to be displayed. Furthermore, even through the gesture operation is performed for the finished document image displayed in the preview area (even though pinch-in/pinch-close is performed for the document image with finger tips), the preview is reduced to be displayed. Note that, the pinch-in/pinch-close is an operation of reducing performed with reducing a space between two fingers.

Note that, when there are a lot of numbers of pages of document images displayed in the preview area 3000, a display page selection button for which the touch operation is able to be performed (a page number input button, a page forward button, page turn-back button, a single page display button, a plurality-page display button, etc.,) may be displayed. Note that, even though the gesture operation (flick) is performed for the document image, it is also possible to perform the page forward and the page turn-back of the document to be previewed. Furthermore, when the document image to be displayed in the preview area 3000 is large, a scroll bar which is able to be operated with the touch operation or the gesture operation may be displayed. The flick is an operation of brushing with a finger.

In the action panel area 4000, information on assistance/advice/suggestion concerning an operation is displayed. In the action panel area 4000, for example, when a user selects a specific function, a function related to the function is displayed, another function related to the function is displayed in an object-oriented way, or functions selected in combination by the user or users in a group to which the user belongs in the past are displayed as a "recommendation function".

In the task trigger area 5000, trigger items to be operated by a user for actually operating the image forming apparatus 100 after completing all the settings in the operation mode are displayed. For example, a start button for starting processing (software button) is included. Note that, in the operation mode associated with printing (except the FAX transmission), the information on a shortage of consumables also relates to unexecutability of tasks, and is therefore displayed in the "task trigger area".

In this case, only when a start button is in the state of being able to be pressed, it is also preferable to display the start button. The state where the start button is able to be pressed is a state where all the settings are finished and the consumables (recording sheets and a toner) are not short in the case of the mode associated with printing, and refers to a state where all the settings of transmission parameters including a destination are finished in the case of the FAX mode (transmission) which is the mode not associated with printing.

The arranged positions of such 5 areas are not changed even though the operation mode is changed (even in an initial screen of any operation modes). Furthermore, the area is changed by contracting and expanding the size in the width direction (longitudinal direction) of the screen of the touch panel display 130 as a switch display of the icon mode/regular mode/express mode in the function setting area 2000 (and the preview area 3000).

The arrangement of such 5 areas is made in consideration of a user interface in the conventional device and focusing on the movement line of the viewpoint and the movement line of the operation of the user. With such an arrangement, in the touch panel display 130, the user's line of sight is moved from the upper left to the lower right so that the operation of the user (a finger tip of a dominant hand) is moved from the upper left to the lower right. Thereby, an effect that a user-friendly operation is able to be performed is exerted.

Note that, in order to transit from a certain operation mode to an other operation mode, the home key 148 (FIG. 3) is pressed to select the other operation mode on a home screen. In this manner, through the home screen, the operation mode is switched.

(Initial Screen Display Operation of Copy Mode)

When a copy mode is selected, an initial screen of the copy mode is displayed on the touch panel display 130 with use of copy initial screen data that is read from the hard disk 302 (FIG. 3) or the like.

At the time, for example, as shown in FIG. 5, a copy mode initial screen 7100 is displayed on the touch panel display 130. On the copy mode initial screen 7100, information is divided into 5 areas of the above-described layout configuration to be displayed.

In the system area 1000 of the copy mode initial screen 7100, as shown in FIG. 5, arranged are an area 1102 that shows an operation mode (here, copy mode) that is selected, an area 1104 that displays sub-information associated with the selected operation mode, an area 1106 that displays a login user name, an area 1108 in which a logout button (software button) is displayed, an area 1110 that displays a job status that is currently executed, an area 1112 in which a button (software button) related to the job status is displayed, an area 1114 in which a communication state is displayed, and an area 1116 in which a current time is displayed.

In the area 1102, a name or/and an icon that shows the operation mode is displayed.

It is also preferable that when, for the area 1102, a touch operation, a tap operation or a double tap operation is performed, a pull-down menu that shows the operation mode is displayed so that the operation mode is switchable (the same also applies to other operation modes).

In the area 1104, an interrupt key (software button) is displayed as the sub-information. When, with the interrupt key, the touch operation, the tap operation or the double tap operation is performed, interrupt processing is able to be executed in the copy mode.

In the area 1106, the job status that is currently executed is displayed with an icon. When, for the job status, the touch operation, the tap operation or the double tap operation is performed, detailed job status information is displayed.

Moreover, in the area 1112, it is also preferable to display a button or the like for stopping the selected job.

In a function setting area 2000 (FIG. 4) of the copy mode initial screen 7100, a function selection menu that is selectable by a user in the copy mode and the above-described change button group 2010 are displayed. On a screen shown in FIG. 5, the function selection menu is displayed in a regular mode.

As shown in FIG. 5, the function selection menu displayed in the regular mode is composed of an icon group 2100 and a text group 2120.

As the function selection menu displayed in the function setting area 2000, displayed are an icon 2102 that sets a copy number and a text 2122 that displays the set content, an icon 2104 that sets a color mode and a text 2124 that displays the set content, an icon 2106 that sets a copy density and a text 2126 that displays the set content, an icon 2108 that sets a copy magnification and a text 2128 that displays the set content, an icon 2110 that sets a type of a document and a text 2130 that displays the set content, an icon 2112 that sets a type of a sheet and a text 2132 that displays the set content, an icon 2114 that edits an image and a text 2134 that displays the set content, and an icon 2116 that edits a layout and a text 2136 that displays the set content.

Note that, as described above, it is possible to vertically display further items in the function setting menu so as to be able to be scrolled in a state where a display position of the change button group 2010 is fixed. Then, it is possible to switch display items of the function setting menus including items that are vertically hidden and not displayed with either a touch operation (scroll operation) or a gesture operation (flick operation in a vertical direction).

Here, an image edit is an image edit for a document of a page, and further lower-level menus include frame elimination, a print menu, a watermark, a user stamp and the like. A layout edit is an image edit for documents of a plurality of pages, and further lower-level menus include page aggregation, a binding margin, movement of a page, centering, and the like. These further lower-level menus are displayed on the touch panel display 130 when, for the icon 2102 to the icon 2116 or the text 2122 to the text 2136, the touch operation, the tap operation or the double tap operation is performed.

In the preview area 3000 (FIG. 4) of the copy mode initial screen 7100, an output (finished) image 3100 of a document and an above-described preview change button group 3010 are arranged. At the time, the image 3100 is displayed with use of dummy data or scan data, and every time a user changes the function setting menu of the function setting area 2000, the image 3100 is changed and displayed in the preview area 3000 (display of a preview is changed).

In the action panel area 4000 (FIG. 4) of the copy mode initial screen 7100, information on assistance/advice/suggestion concerning a copy operation is displayed. Here, as shown in FIG. 5, a recommendation function in a copy mode selected by the user is displayed. At the time, in the action panel area 4000, arranged are an area 4100 that shows a content of the displayed information and an area 4102 to an area 4106 that the recommendation function is displayed in text by serving themselves as software buttons.

When, for the area 4102, the touch operation, the tap operation or the double tap operation is performed, further detailed information on an energy saving copy is pulled down to be displayed. For example, at the time, displayed are a software button that transfers to a function setting screen of duplex copying along with a text that "paper is savable in double-sided printing", a software button that transfers to a function setting screen of the page aggregation along with a text that "paper is savable in aggregation and printing of a plurality of documents", and a software button that transfers to a function setting screen of saddle stitching along with a text that "possible to print as binding like a book".

In the task trigger area 5000 (FIG. 4) of the copy mode initial screen 7100, an execution button group 5100 is displayed.

As the execution button group 5100, arranged are a scan-in key (software button) 5102 that activates the image forming apparatus 100 so as to scan a document and obtain image data, a clear-all key (software button) 5104 that clears the set functions, a monochrome start key (software button) 5106 that activates the image forming apparatus 100 so as to scan a document and execute a monochrome copy, and a color start key (software button) 5108 that activates the image forming apparatus 100 so as to scan a document and execute a color copy.

In this manner, in the copy mode initial screen 7100 on which information is divided into 5 areas to be displayed, when a user inputs a request, copy processing is executed according to the request.

Next, description will be given for a change operation of a preview page in the case of displaying the function setting area 2000 (FIG. 4) in an icon mode and widening the preview area 3000 (FIG. 4).

As shown in FIG. 6, in a case where an image 3118 of a preview is displayed, when a user flicks to the right a screen that is displayed in a preview, an input track is analyzed. At the time, the gesture operation by the user is analyzed as a request for turning a page, and a preview image of another page that is not displayed and a page corresponding to a flicked direction is displayed.

Additionally, in order to move a page displayed in a preview image in this manner, it is also possible to perform with the touch operation of a page forward button 3118G, a page fast-forward button 3118H, a page turn-back button 3118E and a page fast-turn-back button 3118D. Further, it is also possible that a page direct designation button 3118F is touched and a page that is desired to be moved is directly input so that a page in which the preview image is displayed is moved.

In this manner, when the function setting area 2000 is displayed in the icon mode, the preview area 3000 is enlarged, and as shown in FIG. 6, it is possible to display the preview image so as to enhance visibility of a user and operability of a user. In particular, it is possible to display a desired preview by moving with the touch operation or the gesture operation to the preview image that is desired to be displayed.

Note that, a 3118A as shown in FIG. 6 is a trash box icon, and as with the above-described trash box icon 3112A, the selected page is dragged to the trash box icon 3112A so that the page is able to be deleted. Drag is an operation in which a finger is shifted.

Further, as with the above-described one-page display icon 3116B, an one-page display icon 3118B is pressed so that, for example, a preview with three-page display is changed to one-page display (at the time, one page is largely displayed). On the other hand, as with the above-described plurality-page display icon 3116c, a plurality-page display button 3118C is pressed so that, for example, a preview with one-page display is changed to three-page display.

Next, description will be given in detail for a configuration of the operation unit 120 (FIG. 1, FIG. 3) with reference to drawings.

Figure 7:
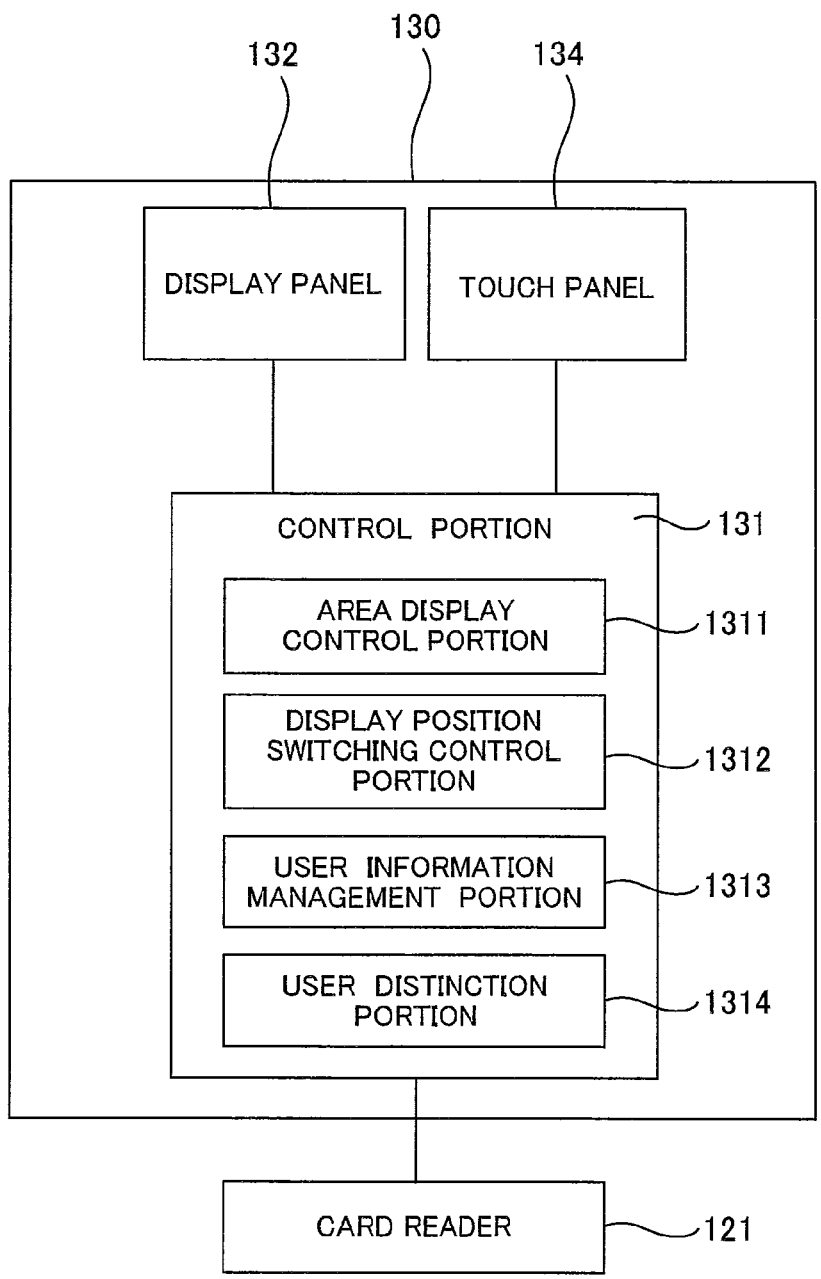
FIG. 7 is a block diagram showing a configuration of an operation unit of the image forming apparatus.
Figure 8:
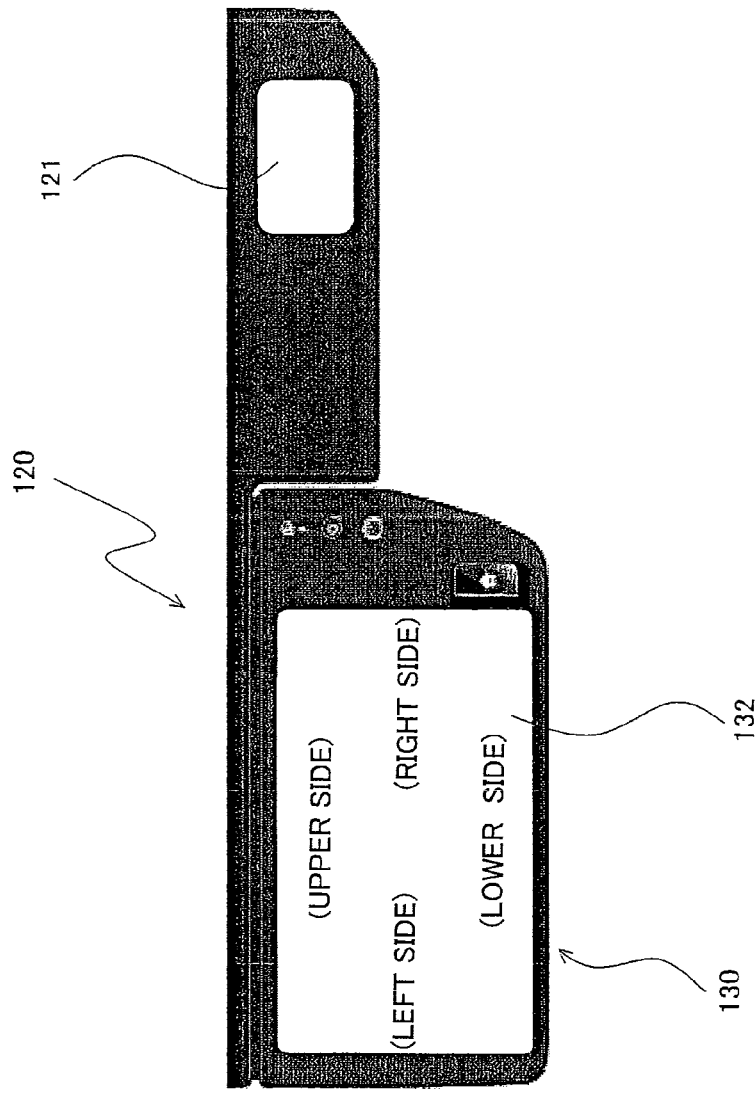
FIG. 8 is an explanatory view showing a configuration of the touch panel display of the operation unit and a vicinity thereof.

FIG. 7 is a block diagram showing a configuration of an operation unit of an image forming apparatus according to the present embodiment, and FIG. 8 is an explanatory view showing a configuration of a touch panel display of the operation unit and a vicinity thereof.

The operation unit 120 according to the present embodiment, in addition to the above-described configuration, as the control portion 131 in the touch pane display 130, as shown in FIG. 7, is provided with an area display control portion 1311, a display position switching control portion 1312, a user information management portion 1313 and a user discrimination portion 1314.

The area display control portion 1311 controls, on an operation screen in a processing mode that is displayed on the display panel 132 (FIG. 1, FIG. 3), as shown in FIG. 4, so that, with a central focus on the preview area 3000, the function setting area 2000 and the action panel area 4000 as well as the task trigger area 5000 are displayed at positions opposing each other. That is, the preview area 3000 is provided so as to be disposed between the function setting area 2000 and the action panel area 4000/task trigger area 5000.

The display position switching control portion 1312 controls so as to switch a positional relation in which the function setting area 2000 and the action panel area 4000 as well as the task trigger area 5000 are displayed.

The user information management portion 1313 discriminates a "dominant hand" and a "stature" of a user based on user information that is read from an IC card of the user.

The user discrimination portion 1314 performs authentication of use of the image forming apparatus 100 by a user based on authentication information read out from the IC card of the user. That is, the user discrimination portion 1314 records ID information of the user in advance and matches such ID information to the authentication information, and when the authentication information is included in the ID information, use of the image forming apparatus 100 by the user is permitted. Note that, authentication of the user with use of the ID information and the authentication information by the user discrimination portion 1314 may be omitted.

User information recorded in the IC card of the user includes dominant-hand information that specifies whether a dominant hand of the user is a right hand or a left hand, and height information that specifies a height of the user.

In order to read information in the IC card of the user, as shown in FIG. 8, the operation unit 120 is provided with the card reader 121 for reading the IC card in the vicinity of the touch panel display 130. That is, the authentication information and the user information are read by the control portion 131 by which the user holds the IC card over the card reader 121.

Note that, the IC card is a card in which an integrated circuit (IC) is incorporated for recording of information (data) and calculation. The IC card may be allowed to perform information processing inside the card by incorporating a calculation processing function and a semiconductor memory.

Furthermore, for a read/write method of the IC card, both a contact type and a non-contact type may be allowed.

The display position switching control portion 1312 sets, based on the user information of the authenticated user, positions where the function setting area 2000 and the task trigger area 5000 are displayed on the operation screen displayed on the display panel 132.

That is, the display position switching control portion 1312 includes, based on the dominant-hand information of the user information, a function that displays the task trigger area 5000 on the side of the dominant hand of the user by taking the preview area 3000 as a reference. Specifically, in a case where the dominant hand of the user is a right hand, the task trigger area 5000 is displayed on a right side by taking the preview area 3000 as a reference on the display panel 132, and in a case where the dominant hand of the user is a left hand, the task trigger area 5000 is displayed on the left side by taking the preview area 3000 as a reference on the display panel 132.

Further, the display position switching control portion 1312 includes, based on the height information of the user information, a function that displays the task trigger area 5000 corresponding to the height of the user by taking the preview area 3000 as a reference. Specifically, in a case where the user is higher than a predetermined height, the task trigger area 5000 is displayed on an upper side by taking the preview area 3000 as a reference on the display panel 132, and in a case where the user is shorter than the predetermined height, the task trigger area 5000 is displayed on a lower side by taking the preview area 3000 as a reference on the display panel 132. Note that, the predetermined height is able to be arbitrarily set in relation to the height of the operation unit 120 of the image forming apparatus 100. A predetermined height value is stored in the user information management portion 1313, however, a storage location is not limited thereto.

Note that, the user information may include specific setting information that specifies a setting of a screen display for which the user desires. In this case, the display position switching control portion 1312 displays, based on the specific setting information of the user, a position where the task trigger area 5000 is set corresponding to a specific setting by taking the preview area 3000 as a reference.

In the task trigger area 5000, execution buttons as operation keys are displayed, and in addition to a monochrome start key 5016 and a color start key 5108 as start keys that instruct starting of a processing operation, a clear-all key 5104 that functions as a stop key that instructs to stop the processing operation is provided.

In the present embodiment, the control portion 131 performs control of the touch panel display 130, however, a control portion (not shown) that controls the operation unit 120 may function by doubling as the control portion 131.

Next, description will be given along a flowchart for display processing of an operation screen of a display panel corresponding to the user information by the operation unit 120.

Figure 9:
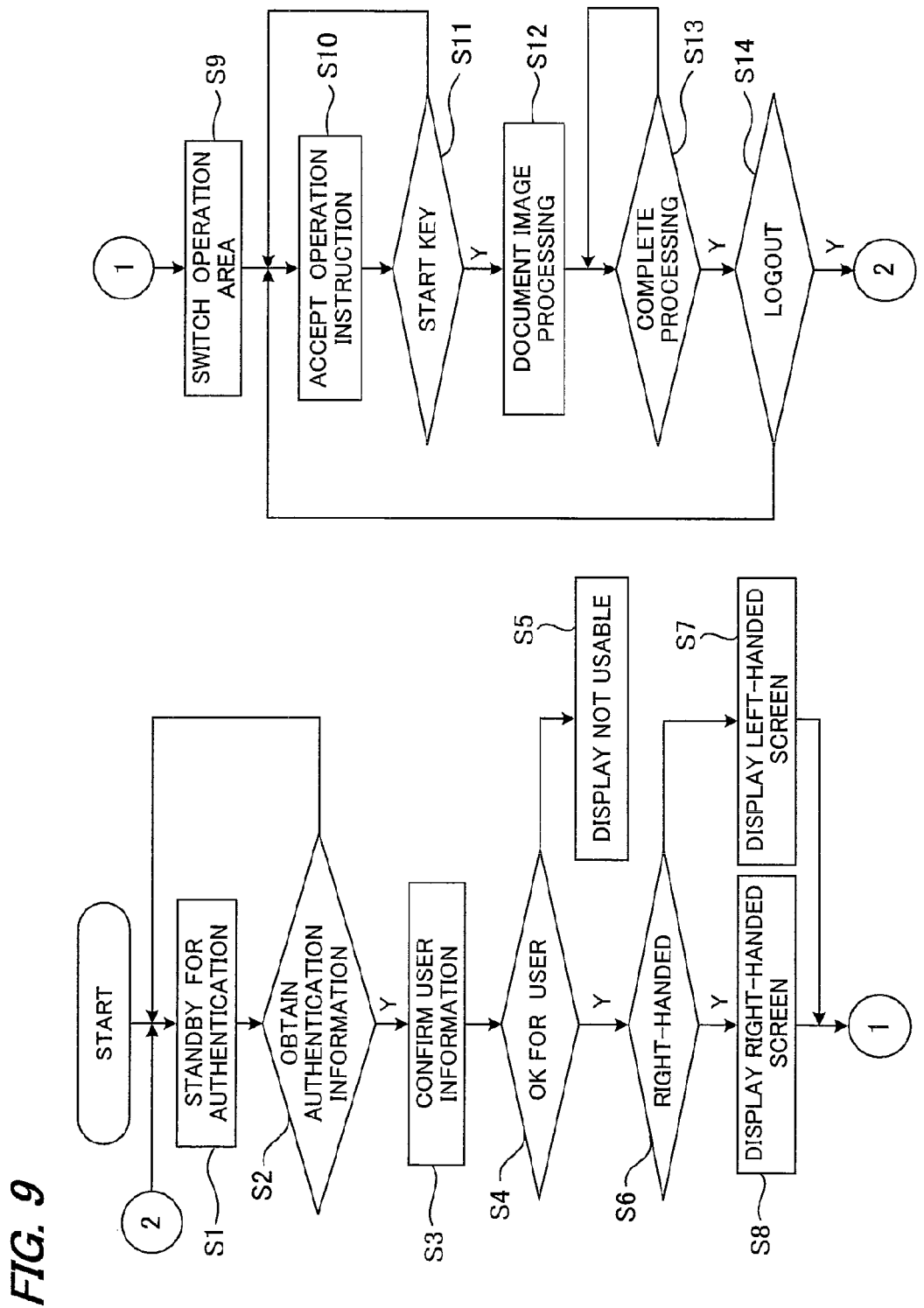
FIG. 9 is a flowchart showing display processing of an operation screen of a display panel corresponding to use conditions of a user by the operation unit of the image forming apparatus.

FIG. 9 is a flowchart showing display processing of an operation screen of a display panel.

The image forming apparatus 100 is on standby as "standby for authentication" until the user is authenticated (step S1).

The user holds the IC card over the card reader 121 so that the authentication information and the user information are read by the card reader 121 (step S2).

When the authentication information is not read into the user discrimination portion 1314 at the step S2, the process returns to the step S1 to be in the state of standby for authentication.

When the authentication information is read into the user discrimination portion 1314 at the step S2, the user information is read into the user information management portion 1313 and confirmed (step S3).

The user discrimination portion 1314 matches the ID information to the authentication information, discriminates (authenticates) that the user is usable when the authentication information is included in the ID information, and discriminates that the user is not usable when the authentication information is not included in the ID information (step S4).

When it is judged that the user is not usable (not authenticated) at the step S4, guidance of "not available" or the like is displayed on the display panel 132 (step S5). Note that, when it is configured that authentication of the user with use of the authentication information is omitted, a step (processing) related to authentication is able to be omitted.

When it is judged that the user is usable at the step S4, next, it is judged whether or not a dominant hand of the user is a right hand (right-handed) (step S6). Then, when it is judged that the user is not "right-handed", a left-handed operation screen is displayed on the display panel 132 (step S7).

On the other hand, when it is judged that the user is "right-handed" at the step S6, a right-handed operation screen is displayed on the display panel 132 (step S8).

An operation area displayed on the display panel 132 (FIG. 3, FIG. 7, FIG. 8) is switched to be displayed so that the task trigger area 5000 (FIG. 4) is located on the side of the dominant hand of the user by taking the preview area 3000 as a reference (FIG. 4) depending on whether the user is "right-handed" or "left-handed", a sensing area of the touch panel 134 (FIG. 3, FIG. 7) is also switched corresponding to the displayed operation area (step S9) so as to be in a state where an operation/instruction of the user is allowed, and a content in which the touch operation is performed based on the operation screen displayed on the display panel 132 is set as processing conditions, while it becomes a standby state of awaiting an operation of a start key (step S10).

When a start key is pressed (step S11), processing of document image data based on an operation content for a document image is executed (step S12). Predetermined processing is completed (step S13) and logout is performed (step S14), then use permission of the authenticated user is cancelled and the process returns to the step S1 to be a standby state of awaiting authentication of a next user.

When logout is not performed at the step S14, the process returns to the step S10 to be a standby state of awaiting an operation/instruction of the user.

As described above, in the image forming apparatus 100, it is possible to display an operation screen corresponding to user information of a user, and this makes it possible for the user to operate on an accessible operation screen.

Next, specific description will be given for an operation screen displayed on the display panel 132 of the touch panel display 130 based on user information with reference to drawings.

Figure 10:
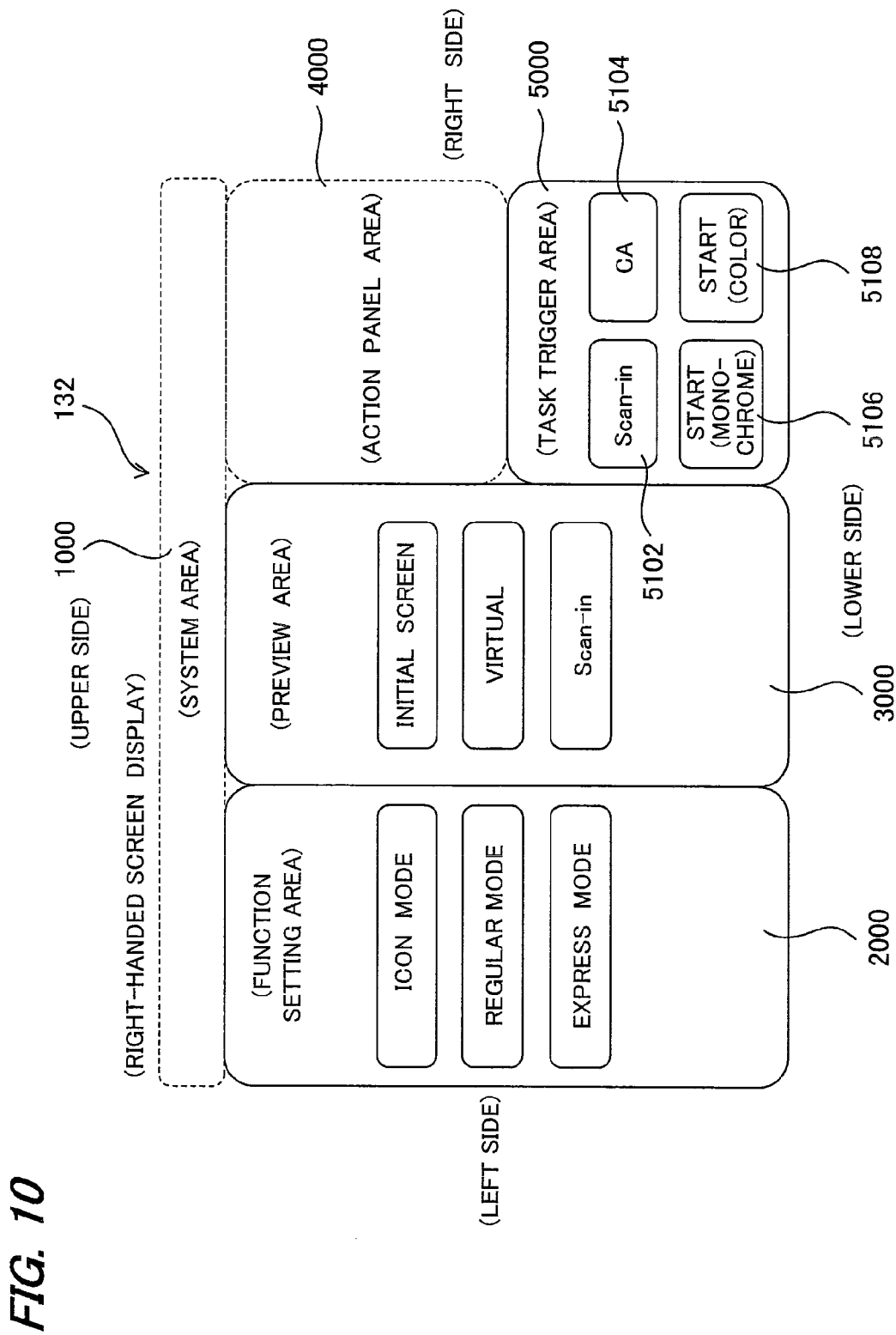
FIG. 10 is an explanatory view showing a state of the operation screen displayed on the display panel in the image forming apparatus in a case where a user is "right-handed"
Figure 11:
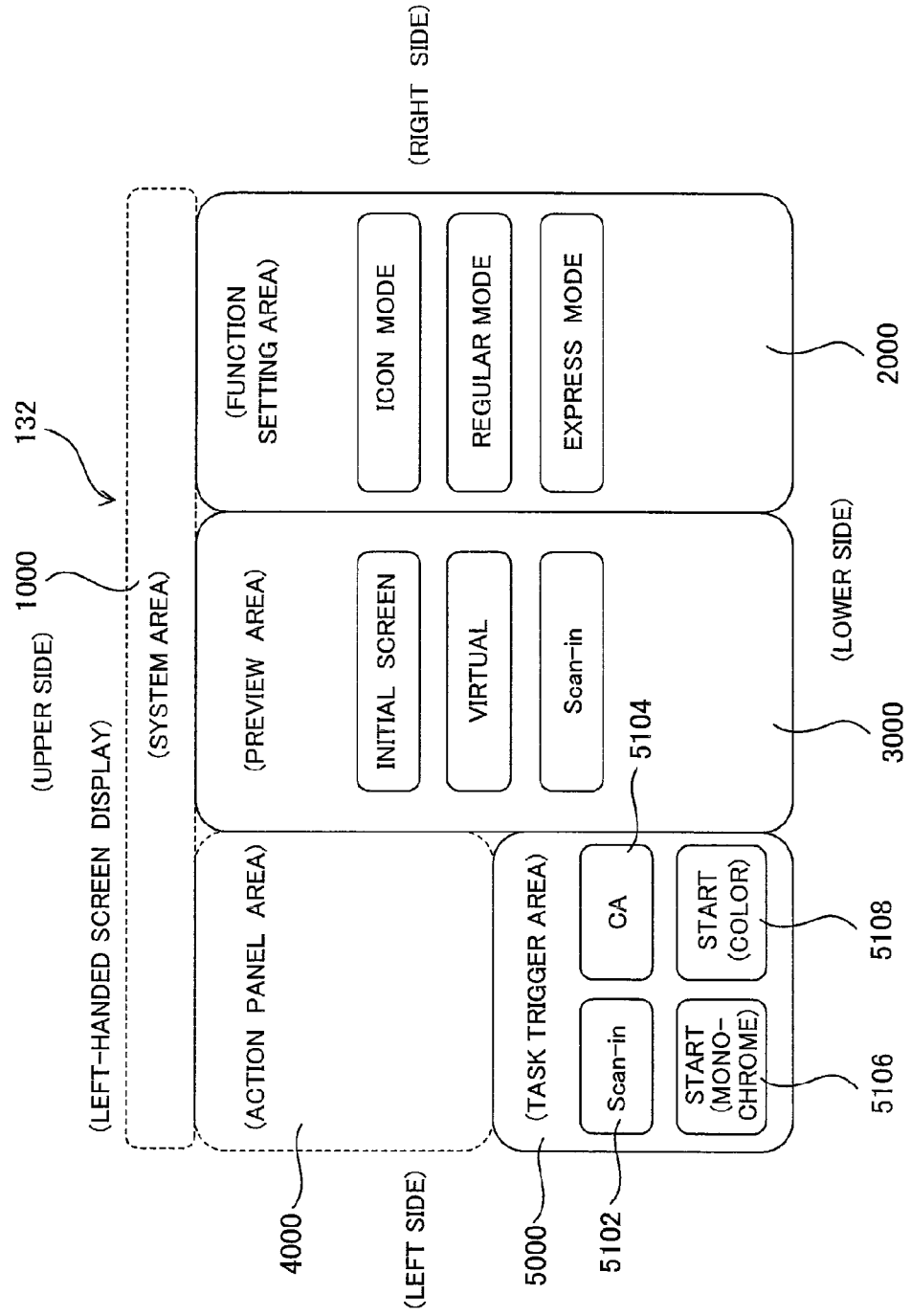
FIG. 11 is an explanatory view showing a state of the operation screen displayed on the display panel in the image forming apparatus in a case where a user is "left-handed"
Figure 12:
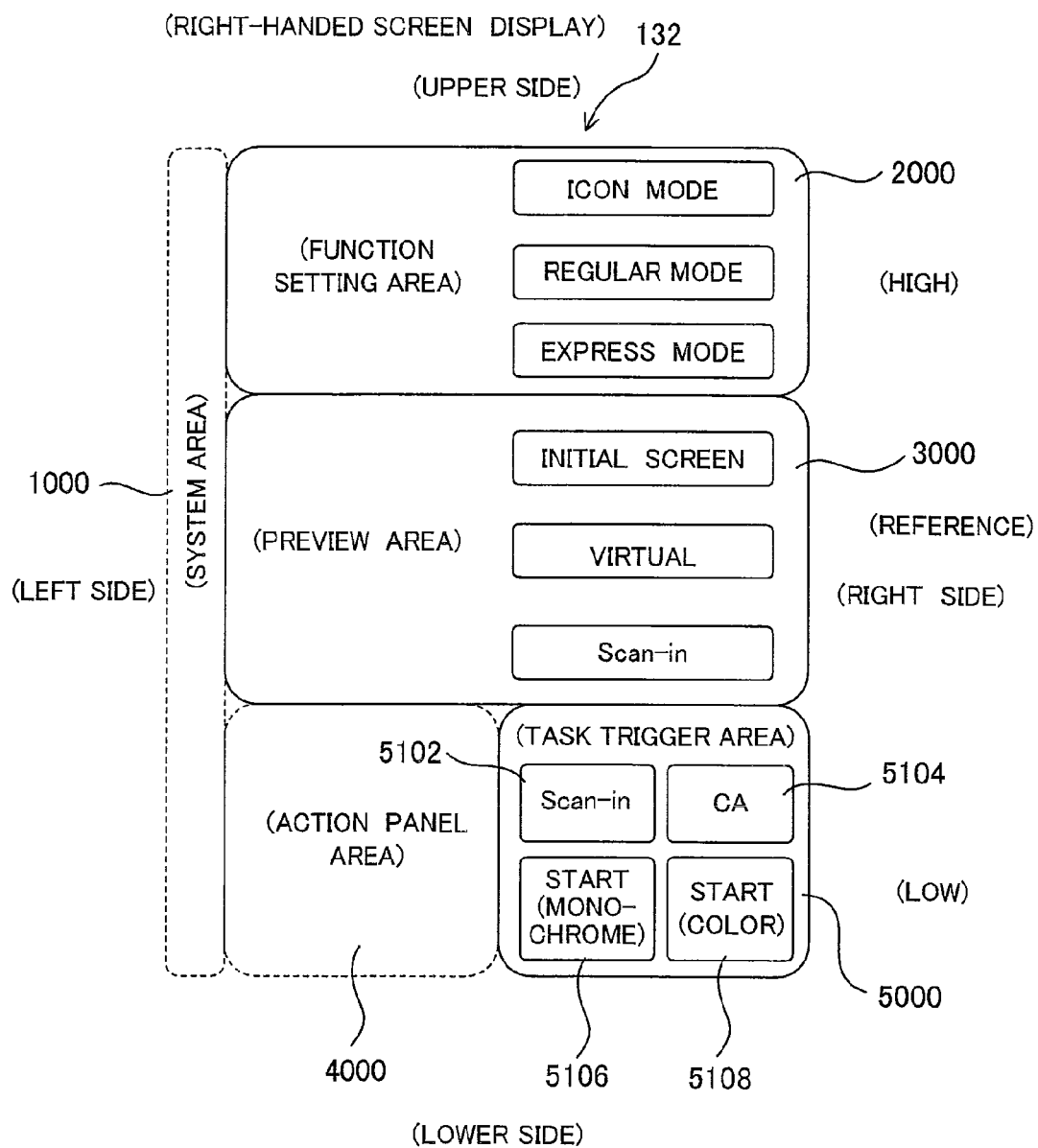
FIG. 12 is an explanatory view showing a state of the operation screen displayed on the display panel in the image forming apparatus in a case where a user is "right-handed" and whose height is short.
Figure 13:
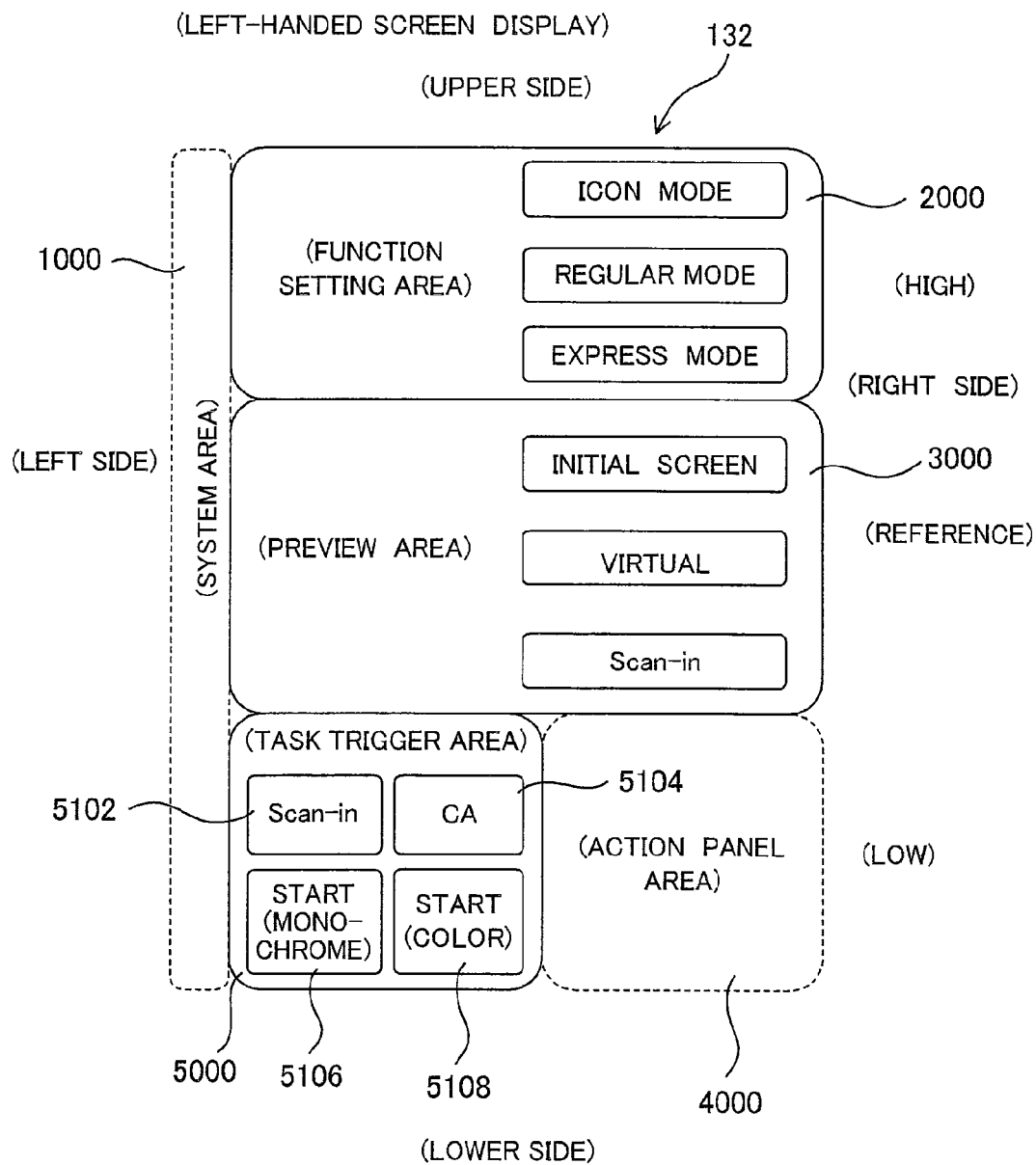
FIG. 13 is an explanatory view showing a state of the operation screen displayed on the display panel in the image forming apparatus in a case where a user is "left-handed" and whose height is short.
Figure 14:
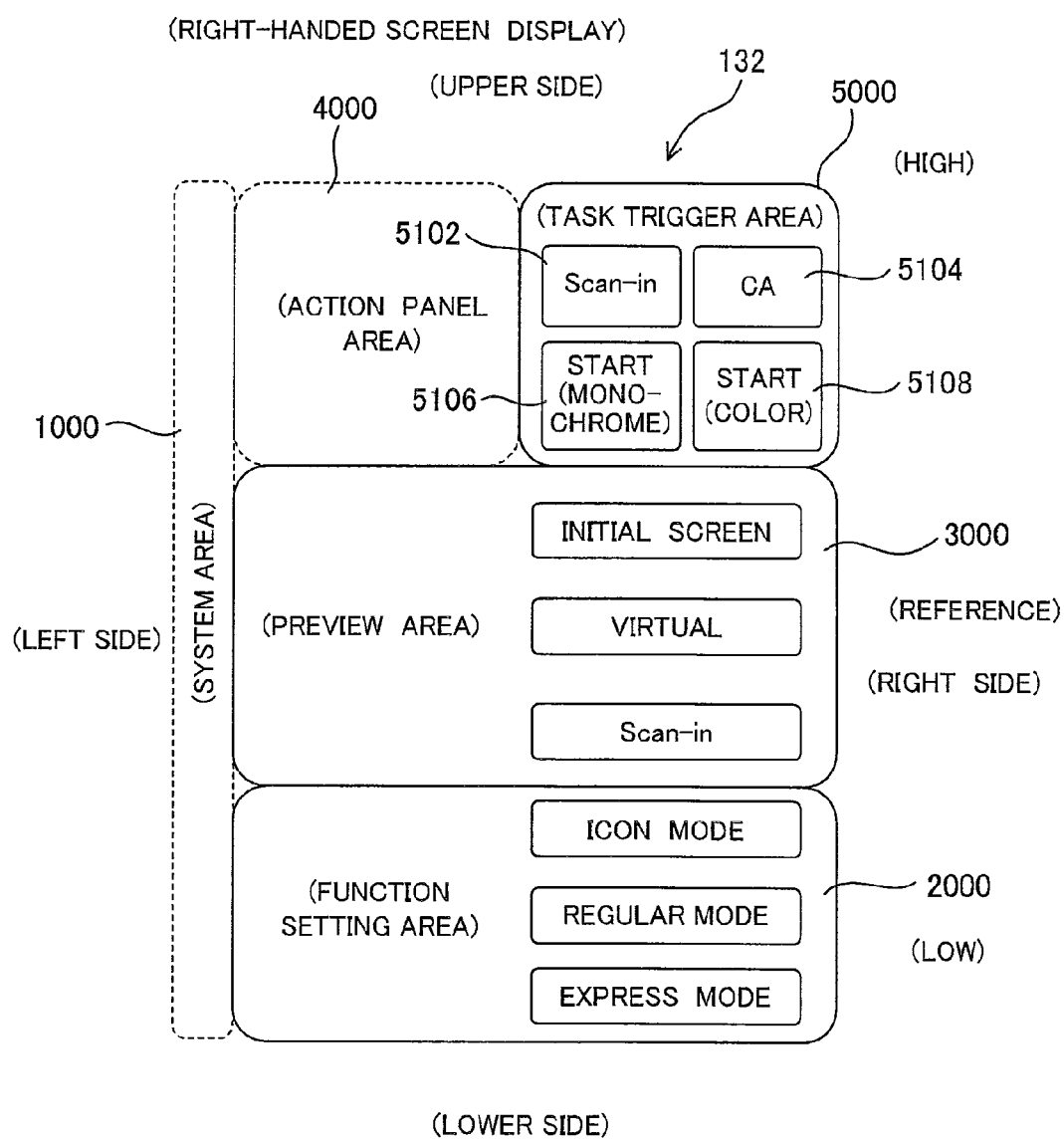
FIG. 14 is an explanatory view showing a state of the operation screen displayed on the display panel in the image forming apparatus in a case where a user is "right-handed" and whose height is tall.
Figure 15:
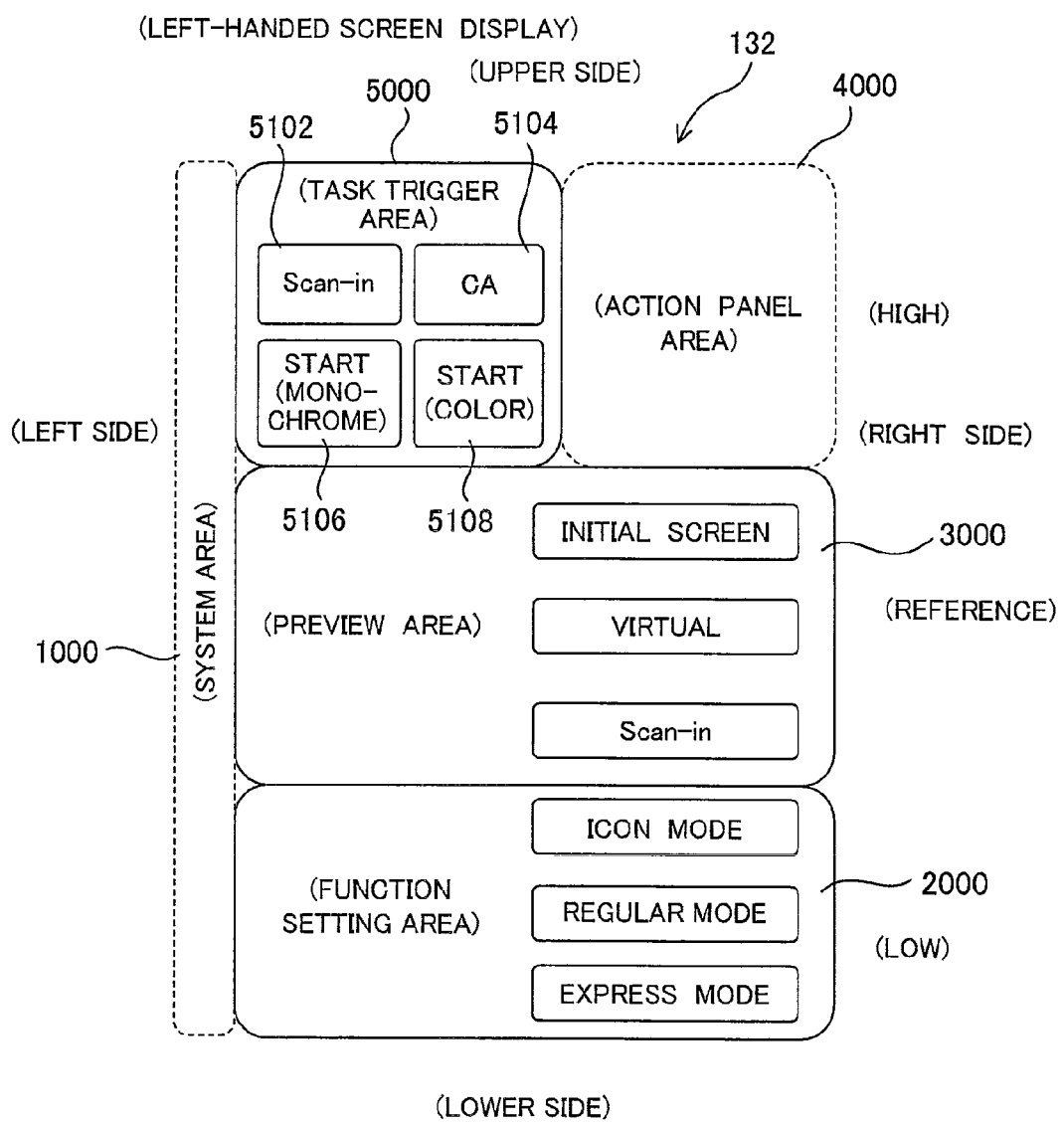
FIG. 15 is an explanatory view showing a state of the operation screen displayed on the display panel in the image forming apparatus in a case where a user is "left-handed" and whose height is tall.

FIG. 10 is an explanatory view showing a state of an operation screen displayed on a display panel in a case where a user is "right-handed", FIG. 11 is an explanatory view showing a state of the operation screen displayed on the display panel in a case where a user is "left-handed", FIG. 12 is an explanatory view showing a state of the operation screen displayed on the display panel in a case where a user is "right-handed" and whose height is short, FIG. 13 is an explanatory view showing a state of the operation screen displayed on the display panel in a case where a user is "left-handed" and whose height is short, FIG. 14 is an explanatory view showing a state of the operation screen displayed on the display panel in a case where a user is "right-handed" and whose height is tall, and FIG. 15 is an explanatory view showing a state of the operation screen displayed on the display panel in a case where a user is "left-handed" and whose height is tall.

First, description will be given for a case where a user of the image forming apparatus 100 is "right-handed" based on the user information.

When it is judged that the user of the image forming apparatus 100 is "right-handed", as shown in FIG. 10, on the operation screen in a processing mode displayed on the display panel 132, with a central focus on the preview area 3000, the action panel area 4000 and the task trigger area 5000 are arranged on a right side (dominant-hand side), and the function setting area 2000 is arranged on a left side. The action panel area 4000 and the task trigger area 5000 are displayed at positions neighboring to (opposing) the preview area 3000 in a horizontal direction, respectively. The system area 1000 is displayed on an upper side on the display panel 132.

The task trigger area 5000 that starts an operation is displayed on a lower side of the action panel area 4000. Since a user places his/her palm for operation approximately on a lower side with respect to the display panel 132, the task trigger area 5000 is displayed on a right side and a lower side on the display panel 132 so that it becomes a state where the user easily operates.

Next, description will be given for a case where a user of the image forming apparatus 100 is "left-handed" based on the user information.

When it is judged that the user of the image forming apparatus 100 is "left-handed", as shown in FIG. 11, on the operation screen in the processing mode displayed on the display panel 132, with a central focus on the preview area 3000, the action panel area 4000 and the task trigger area 5000 are arranged on a left side (dominant-hand side), and the function setting area 2000 is arranged on a right side. The action panel area 4000 and the task trigger area 5000 are displayed at positions neighboring to (opposing) the preview area 3000 in a horizontal direction, respectively. The system area 1000 is displayed on an upper side on the display panel 132.

The task trigger area 5000 that starts an operation is displayed on a lower side of the action panel area 4000. When the user performs the touch operation of the touch panel 134, it is natural to place his/her palm for operation on an approximately lower side with respect to the display panel 132, and the task trigger area 5000 is displayed on a left side and a lower side on the display panel 132 so that it becomes a state where the user easily operates.

Next, description will be given for a case where a user of the image forming apparatus 100 is "right-handed" and whose "height is short" based on the user information.

When it is judged that the user of the image forming apparatus 100 is "right-handed" and whose "height is shorter than the predetermined height", as shown in FIG. 12, on the operation screen in the processing mode displayed on the display panel 132, with a central focus on the preview area 3000, the action panel area 4000 and the task trigger area 5000 are arranged on a lower side, and the function setting area 2000 is arranged on an upper side. The action panel area 4000 and the task trigger area 5000 are displayed at positions neighboring to (opposing) the preview area 3000 in a vertical direction, respectively. Additionally, the task trigger area 5000 is displayed on a right side (dominant-hand side) of the action panel area 4000. The system area 1000 is displayed on a left side on the display panel 132.

In this manner, when the user is "right-handed" and whose "height is shorter than the predetermined height", the task trigger area 5000 is displayed at a lower position from the preview area 3000 with respect to the display panel 132, and on a right side (dominant-hand side) of the action panel area 4000 so that it becomes a state that is easy to operate for the user.

Next, description will be given for a case where a user of the image forming apparatus 100 is "left-handed" and whose "height is short" based on the user information.

When it is judged that the user of the image forming apparatus 100 is "left-handed" and whose "height is shorter than the predetermined height", as shown in FIG. 13, on the operation screen in the processing mode displayed on the display panel 132, with a central focus on the preview area 3000, the action panel area 4000 and the task trigger area 5000 are arranged on a lower side, and the function setting area 2000 is arranged on an upper side. The action panel area 4000 and the task trigger area 5000 are displayed at positions neighboring to (opposing) the preview area 3000 in a vertical direction, respectively. Additionally, the task trigger area 5000 is displayed on a left side (dominant-hand side) of the action panel area 4000. The system area 1000 is displayed on a left side on the display panel 132.

In this manner, when the user is "left-handed" and whose "height is shorter than the predetermined height", the task trigger area 5000 is displayed at a lower position than the preview area 3000 with respect to the display panel 132, and on a left side (dominant-hand side) of the action panel area 4000 so that it becomes a state that is easy to operate for the user.

Next, description will be given for a case where a user of the image forming apparatus 100 is "right-handed" and whose "height is taller than the predetermined height" based on the user information.

When it is judged that the user of the image forming apparatus 100 is "right-handed" and whose "height is taller than the predetermined height", as shown in FIG. 14, on the operation screen in the processing mode displayed on the display panel 132, with a central focus on the preview area 3000, the action panel area 4000 and the task trigger area 5000 are arranged on an upper side, and the function setting area 2000 is arranged on an lower side. The action panel area 4000 and the task trigger area 5000 are displayed at positions neighboring to (opposing) the preview area 3000, respectively. The system area 1000 is displayed on a left side on the display panel 132.

Additionally, the task trigger area 5000 is displayed on a right side (dominant-hand side) of the action panel area 4000.

In this manner, when the user is "right-handed" and whose "height is taller than the predetermined height", the task trigger area 5000 is displayed at a higher position than the preview area 3000 with respect to the display panel 132, and on a right side (dominant-hand side) of the action panel area 4000 so that it becomes a state that is easy to operate for the user.

Next, description will be given for a case where the user of the image forming apparatus 100 is "left-handed" and whose "height is taller than the predetermined height" based on the user information.

When it is judged that the user of the image forming apparatus 100 is "left-handed" and whose "height is taller than the predetermined height", as shown in FIG. 15, on the operation screen in the processing mode displayed on the display panel 132, with a central focus on the preview area 3000, the action panel area 4000 and the task trigger area 5000 are arranged on an upper side, and the function setting area 2000 is arranged on an lower side. The action panel area 4000 and the task trigger area 5000 are displayed at positions neighboring to (opposing) the preview area 3000, respectively. The system area 1000 is displayed on a left side on the display panel 132.

Additionally, the task trigger area 5000 is displayed on a left side (dominant-hand side) of the action panel area 4000.

In this manner, when the user is "right-handed" and whose "height is taller than the predetermined height", the task trigger area 5000 is displayed at a higher position than the preview area 3000 with respect to the display panel 132, and on a left side (dominant-hand side) of the action panel area 4000 so that it becomes a state that is easy to operate for the user.

Here, specific display examples on the display panel 132 are shown.

Figure 16A:
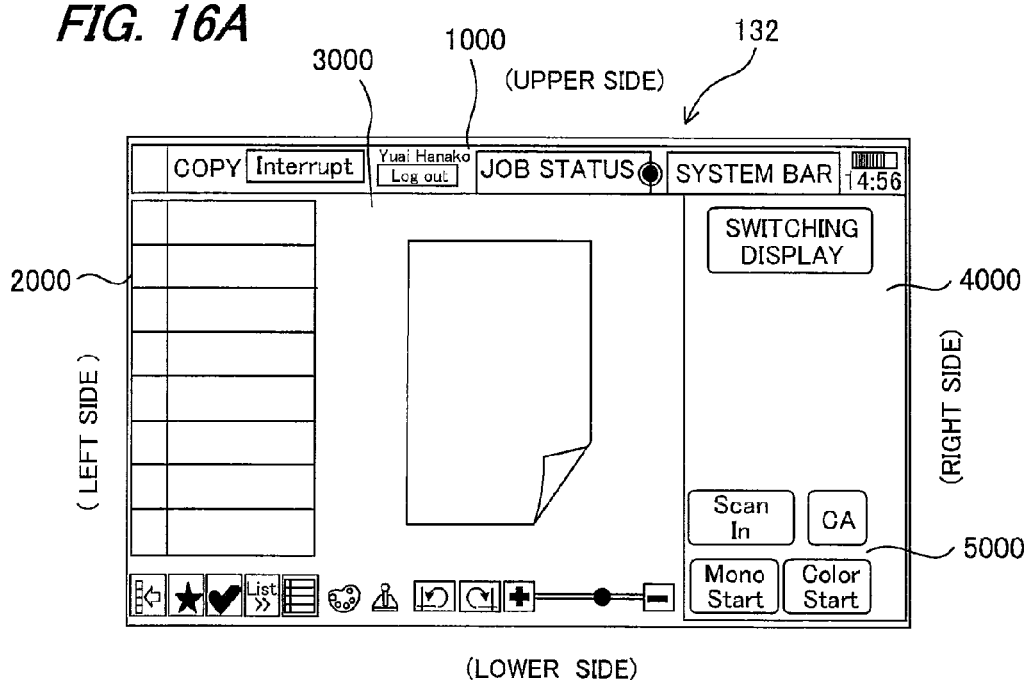
FIG. 16A is an explanatory view showing a specific display example 1 of the operation screen displayed on the display panel in the image forming apparatus in a case where a user is "right-handed"
Figure 16B:
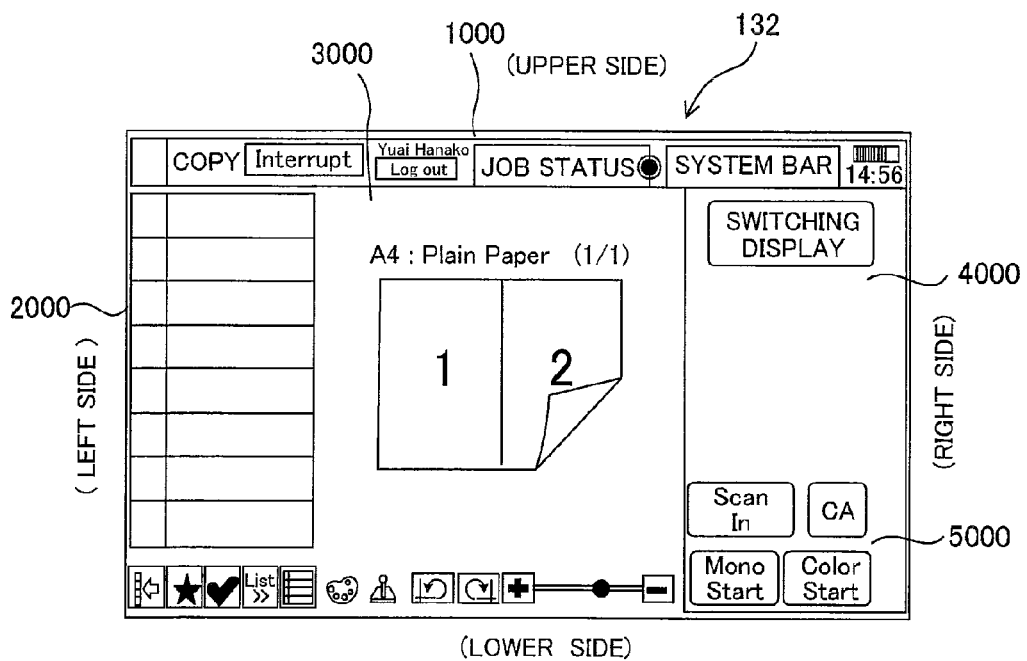
FIG. 16B is an explanatory view showing a specific display example 2 in a case where a user is "right-handed"
Figure 17A:
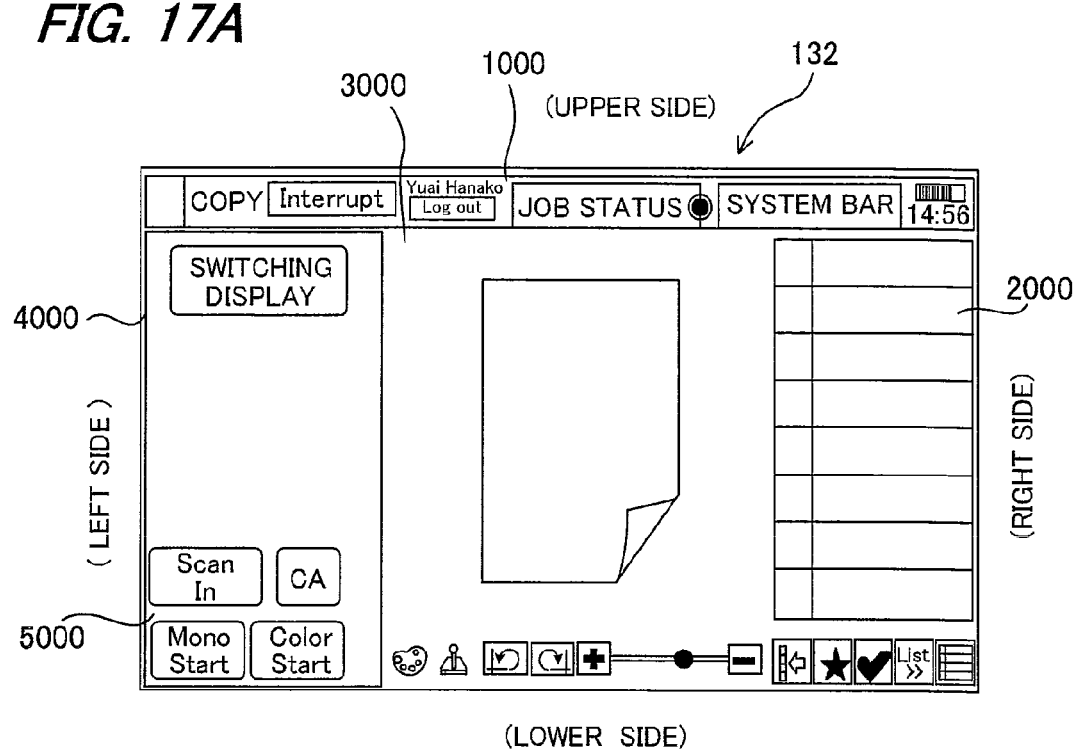
FIG. 17A is an explanatory view showing a specific display example 3 of the operation screen displayed on the display panel in the image forming apparatus in a case where a user is "left-handed"
Figure 17B:
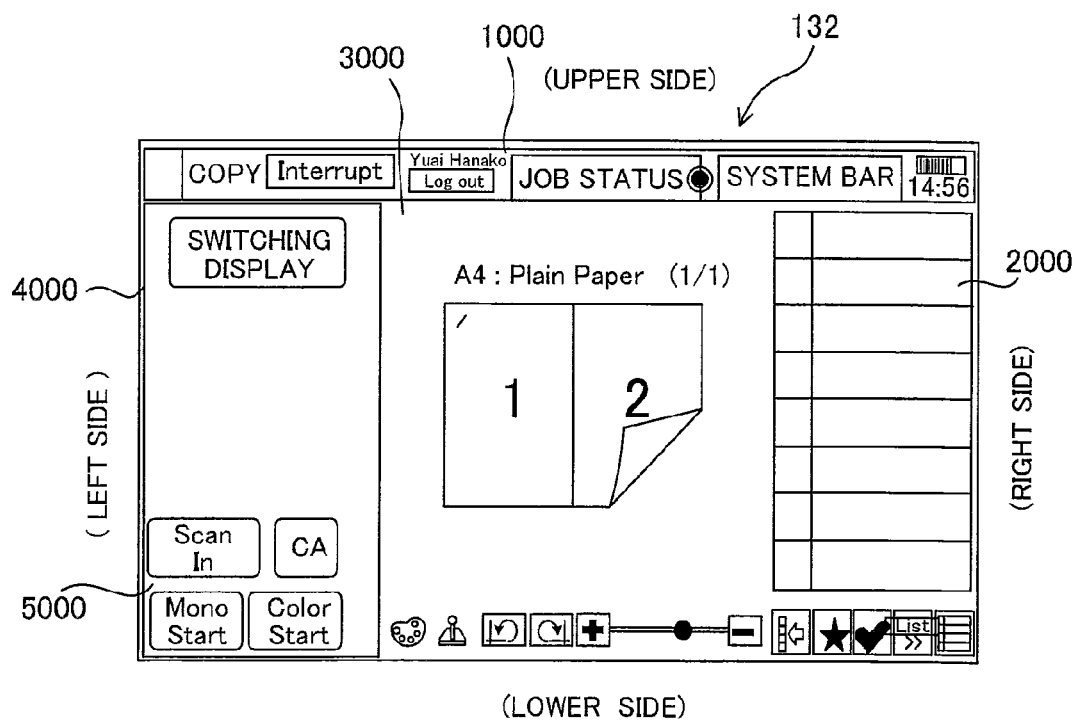
FIG. 17B is an explanatory view showing a specific display example 4 in a case where a user is "left-handed".

FIG. 16A shows a specific display example 1 of an operation screen displayed on a display panel in a case where a user of an image forming apparatus is "right-handed", FIG. 16B shows a display example 2 in a case where the user is "right handed", FIG. 17A shows a specific display example 3 of the operation screen displayed on the display panel in a case where the user of the image forming apparatus is "left-handed", and FIG. 17B shows a display example 4 in a case where the user is "left-handed".

When the user of the image forming apparatus 100 is "right-handed", as shown in FIG. 16A and FIG. 16B, on the operation screen displayed on the display panel 132, with a central focus on the preview area 3000, the action panel area 4000 and the task trigger area 5000 are arranged on a right side (dominant-handed side), and the function setting area 2000 is arranged on a left side.

The preview area 3000 of FIG. 16A displays document images sheet by sheet. The preview area 3000 of FIG. 16B displays a state where images after printing are bound.

When the user of the image forming apparatus 100 is "left-handed", as shown in FIG. 17A and FIG. 17B, on the operation screen displayed on the display panel 132, with a central focus on the preview area 3000, the action panel area 4000 and the task trigger area 5000 are arranged on a left side (dominant-handed side), and the function setting area 2000 is arranged on a right side to be displayed.

The preview area 3000 of FIG. 17A displays document images sheet by sheet. The preview area 3000 of FIG. 17B displays a state where images after printing are bound.

As described above, the operation unit 120 in the image forming apparatus 100 is provided with the area display control portion 1311 that displays the function setting area 2000 and the task trigger area 5000 by disposing the preview area 3000 in between, and the display position switching control portion 1312 that switches a positional relation in which the function setting area 2000 and the task trigger area 5000 are displayed, so that when the operation screen is displayed on the display panel 132 in the touch panel display 130, with a central focus on the preview area 3000, the function setting area 2000 and the task trigger area 5000 are able to be horizontally arranged and displayed, or vertically arranged and displayed.

Then, since based on the use information of the user, the area display control portion 1311 enables the task trigger area 5000 to be displayed at a position optimum for the user corresponding to a "dominant hand", a "stature" and the like of the user, it is possible to perform a smooth operation/instruction in a state where a status of a function setting displayed in the preview area 3000 in a center area on the display screen 132 is confirmed, while a desired output form is secured.

Further, the operation unit 120 is provided with the card reader 121, and the card reader 121 reads user information stored in an IC card, then the user information is managed by the user information management portion 1313, so that it is possible to manage the user information simply and reliably.

Note that, in the present embodiment, the user information and authentication information of the user are stored in the IC card, however, a recording medium that records the user information and the authentication information is not limited to the IC card, and may be the one that is able to write and read the user information and the authentication information. For example, as the recording medium, a magnetic stripe card, a bar code or the like may be used.

Further, a method of obtaining the user information of the user is not limited to a method of reading from the recording medium. For example, the user information of the user that uses the image forming apparatus 100 is registered in advance in the user information management portion 1313, and the user information may be recognized from the authentication information. Additionally, for obtaining the user information, with use of any communication means, the user information of the user may be input to the user information management portion 1313.

Further, authentication of the user is not limited to a method of reading the authentication information from the recording medium, and the user himself/herself may input an authentication code to the image forming apparatus 100, or may employ biometric authentication with use of biological information.

Further, at the time of use of the image forming apparatus 100, user authentication itself using the authentication information may be omitted.

Further, an arrangement position (display position) of an operation image displayed on the display panel 132 is not limited to a layout shown in the present embodiment and other display examples, and may be displayed at a position where the function setting area 2000 faces the task trigger area (processing start instruction area) 5000 by taking the preview area 3000 as a reference. That is, the function setting area 2000 and the task trigger area (processing start instruction area) 5000 may be displayed by disposing the preview area 3000 in between.

Note that, in the above-described embodiment, description was given for examples in which the operation unit 120 as an operation setting device is applied to the image forming apparatus 100 as shown in FIG. 1, however, it is possible to apply to an image forming apparatus, a copier and the like that perform an operation/instruction with the touch operation by displaying the operation screen on the display panel.

As described above, the present invention is not limited to the above-described embodiment, and various changes are allowed in the scope shown in the claims. It is obvious that a person skilled in the art thinks out various change examples or modification examples within a category described in the claims, that is, embodiments that are obtained in combination with technical means changed as appropriate in the scope without departing from the spirit and scope of the present invention are also included in a technical scope of the present invention.

What is claimed is:

1. An operation setting device comprising:
a touch operation recognition portion which recognizes a touch operation in operating a screen;
a display portion which displays an operation screen in a processing mode; and
a control portion which causes the display portion to display the operation screen so as to allow the touch operation recognition portion to provide an operation instruction, wherein
the operation screen in the processing mode includes at least a preview area, a function setting area, and a processing start instruction area,
the control portion includes,
on the operation screen, an area display function which displays the function setting area and the processing start instruction area at positions opposing each other by taking the preview area as a reference, and
a display position switching function which switches a positional relation in which the function setting area and the processing start instruction area are displayed, and
wherein a display position switching control portion which sets positions in which the function setting area and the processing start instruction area are displayed on the operation screen based on user information on a user who performs an operation is provided, and
wherein the user information includes height information which specifies a height of a user, and
wherein the user display position switching control portion includes a function to display the processing start instruction area on a upper side by taking the preview area as a reference when the user is taller than a predetermined height, and to display the processing start instruction area on a lower side by taking the preview area as a reference when the user is shorter than the predetermined height, based on the height information.

2. The operation setting device according to claim 1, wherein an operation key is displayed in the processing start instruction area, and
the operation key includes a start key which provides an instruction of starting of a processing operation and a stop key which provides an instruction of stopping of the processing operation.

3. The operation setting device according to claim 1, wherein the user information includes dominant hand information which specifies whether a dominant hand of a user is a right hand or a left hand.

4. The operation setting device according to claim 1, wherein the user information includes specific setting information which specifies a setting of screen display desired by a user.

5. The operation setting device according to claim 1, wherein the display position switching control portion includes a function to display the processing start instruction area on a dominant-hand side of the user by taking the preview area as a reference, based on the dominant hand information.

6. The operation setting device according to claim 1, wherein the display position switching control portion includes a function to display the processing start instruction area corresponding to a specific setting by taking the preview area as a reference based on the specific setting information.

7. An image forming apparatus provided with an operation setting device comprising:
the operation setting device according to claim 1 as the operation setting device.

8. An operation setting device comprising:
a touch operation recognition portion which recognizes a touch operation in operating a screen;
a display portion which displays an operation screen in a processing mode; and
a control portion which causes the display portion to display the operation screen so as to allow the touch operation recognition portion to provide an operation instruction, wherein
the operation screen in the processing mode includes at least a preview area, a function setting area, and a processing start instruction area,
the control portion includes,
on the operation screen, an area display function which displays the function setting area and the processing start instruction area at positions opposing each other by taking the preview area as a reference, and a display position switching function which switches a positional relation in which the function setting area and the processing start instruction area are displayed, and wherein provided are a user information management portion which manages user information on a user who performs an operation, a user discrimination portion which performs authentication of a user based on authentication information, and a display position switching control portion which sets positions in which the function setting area and the processing start instruction area are displayed on the operation screen based on the user information on a user who is authenticated by the user discrimination portion, and wherein the user information includes height information which specifies a height of a user, and wherein the display position switching control portion includes a function to display the processing start instruction area on an upper side by taking the preview area as a reference when the user is taller than a predetermined height, and to display the processing start instruction area on a lower side by taking the preview area as a reference when the user is shorter than the predetermined height, based on the height information.

9. The operation setting device according to claim 8, wherein an operation key is displayed in the processing start instruction area, and the operation key includes a start key which provides an instruction of starting of processing operation and a stop key which provides an instruction of stopping of the processing operation.

10. The operation setting device according to claim 8, wherein the user information includes dominant hand information which specifies whether a dominant hand of a user is a right hand or a left hand.

11. The operation setting device according to claim 8, wherein the user information includes specific setting information which specifies a setting of screen display desired by the user.

12. The operation setting device according to claim 8, wherein the display position switching control portion includes a function to display the processing start instruction area on a dominant-hand side of the user by taking the preview area as a reference, based on the dominant hand information.

13. The operation setting device according to claim 8, wherein the display position switching control portion includes a function to display the processing start instruction area corresponding to a specific setting by taking the preview area as a reference based on the specific setting information.

14. An image forming apparatus provided with an operation setting device comprising:

the operation setting device according to claim 8 as the operation setting device.

* * * * *